US012309287B2

(12) United States Patent
Sorensen et al.

(10) Patent No.: US 12,309,287 B2
(45) Date of Patent: *May 20, 2025

(54) SYSTEMS AND METHODS FOR VEHICLE MESSAGE SIGNING

(71) Applicant: Aurora Operations, Inc., Pittsburgh, PA (US)

(72) Inventors: Michael David Sorensen, Pittsburgh, PA (US); Matthew Charles Ellis Wood, Pittsburgh, PA (US); Matthew James Harris, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,202

(22) Filed: Sep. 6, 2023

(65) Prior Publication Data

US 2023/0412395 A1    Dec. 21, 2023

Related U.S. Application Data

(63) Continuation of application No. 16/866,973, filed on May 5, 2020, now Pat. No. 11,792,014.
(Continued)

(51) Int. Cl.
*H04L 9/32* (2006.01)
*H04W 4/44* (2018.01)

(52) U.S. Cl.
CPC .......... *H04L 9/3247* (2013.01); *H04L 9/3263* (2013.01); *H04W 4/44* (2018.02)

(58) Field of Classification Search
None
See application file for complete search history.

(56) References Cited

U.S. PATENT DOCUMENTS 10,027,701 B1 * 7/2018 Himler .................... H04L 69/22
2013/0166914 A1   6/2013 Vandervort
(Continued)

FOREIGN PATENT DOCUMENTS

CN    108063750         5/2018
CN    108063750 A   *   5/2018   ............. G06F 21/31
(Continued)

OTHER PUBLICATIONS gRPC, "Documentation", 2021, https://grpc.io/docs/, retrieved on Oct. 8, 2021, 2 pages.
(Continued)

*Primary Examiner* — William J. Goodchild
(74) *Attorney, Agent, or Firm* — Dority & Manning, P.A.

(57) ABSTRACT

Systems and methods for vehicle message signing are provided. A method includes obtaining, by a vehicle computing system of an autonomous vehicle, a computing system state associated with the vehicle computing system and a message from at least one remote process running a computing device remote from the vehicle computing system. The message is associated with an intended recipient process running on the vehicle computing system. The method includes determining an originating sender for the message. The originating sender is indicative of a remote process that generated the message. The method includes determining a routing action for the message based on a comparison of the originating sender and the computing system state. The routing action includes at least one of a discarding action or a forwarding action to the intended recipient process. The method includes performing the routing action for the message.

20 Claims, 14 Drawing Sheets

Related U.S. Application Data

(60) Provisional application No. 62/990,049, filed on Mar. 16, 2020.

(56) References Cited

U.S. PATENT DOCUMENTS

| | | | | |
|---|---|---|---|---|
| 2013/0212659 | A1* | 8/2013 | Maher | G05D 1/0022 |
| | | | | 726/6 |
| 2015/0338852 | A1* | 11/2015 | Ramanujam | G01C 21/26 |
| | | | | 701/2 |
| 2017/0244565 | A1* | 8/2017 | Bronk | H04W 12/106 |
| 2018/0212780 | A1 | 7/2018 | Talamonti et al. | |
| 2019/0110174 | A1* | 4/2019 | Way | H04W 76/10 |
| 2019/0227569 | A1* | 7/2019 | Weslosky | G07C 5/0825 |
| 2020/0137580 | A1* | 4/2020 | Yang | H04W 12/122 |
| 2020/0313908 | A1* | 10/2020 | Mondello | H04L 9/3239 |
| 2021/0070334 | A1* | 3/2021 | Howard | B61L 27/40 |

FOREIGN PATENT DOCUMENTS

| | | |
|---|---|---|
| CN | 103731469 | 2/2019 |
| CN | 107678790 | 5/2020 |

OTHER PUBLICATIONS

GRPC, "GRPC Experimental", Oct. 5, 2021, https://grpc.github.io/grpc/cpp/classgrpc_1_1experimental_1_1_client_interceptor_factory_interface.html, retrieved on Oct. 8, 2021, 1 page.

gRPC, "Core concepts, architecture and lifecycle", 2021, https://grpc.io/docs/what-is-grpc/core-concepts/, retrieved Oct. 8, 2021, 4 pages.

* cited by examiner

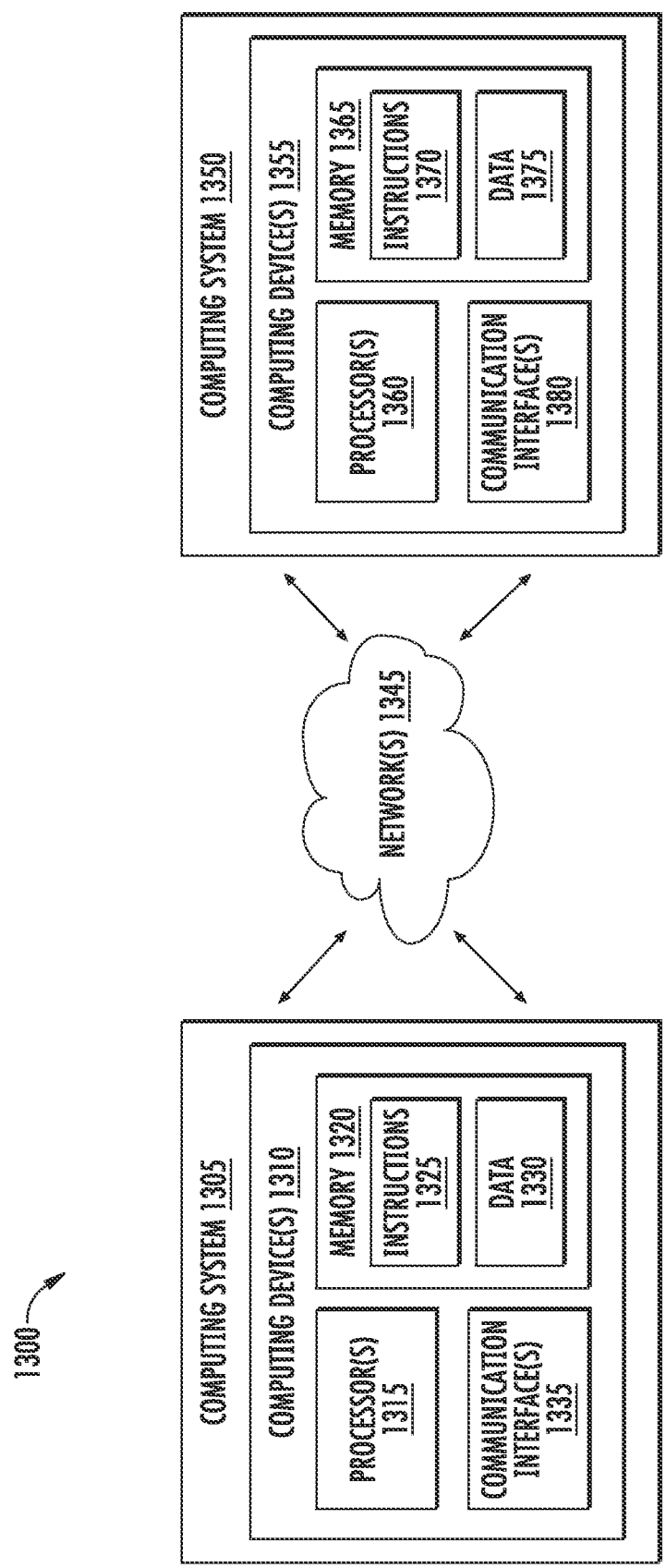

SYSTEMS AND METHODS FOR VEHICLE MESSAGE SIGNING

PRIORITY CLAIM

The present application is a continuation of U.S. application Ser. No. 16/866,973 filed May 5, 2020, which is based on and claims benefit of U.S. Provisional Patent Application No. 62/990,049 having a filing date of Mar. 16, 2020. Applicant claims priority to and the benefit of each of such applications and incorporates all such applications herein by reference in its entirety.

FIELD

The present disclosure relates generally to vehicle security infrastructure. In particular, signing techniques can be utilized to identify different processes interacting with a vehicle.

BACKGROUND

An autonomous vehicle can be capable of sensing its environment and navigating with little to no human input. In particular, an autonomous vehicle can interact with devices that run a plurality of processes. The processes can communicate with each other through a series of messages. The messages can be communicated over encrypted or unencrypted channels.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for filtering messages received by an autonomous vehicle. The method includes obtaining, by a vehicle computing system of the autonomous vehicle including one or more vehicle computing devices, a message associated with an intended recipient process running on the vehicle computing system. The message includes a cryptographic signature. The method includes determining, by the vehicle computing system, an originating sender of the message based at least in part on the cryptographic signature. The originating sender is a remote process of one or more remote processes running on one or more remote computing devices that are remote from the vehicle computing system. The method includes obtaining, by the computing system, a computing system state associated with the vehicle computing system. The method includes determining, by the vehicle computing system, a routing action for the message based on a comparison of the originating sender and the computing system state. The routing action is determined from a plurality of routing actions that include a discarding action indicative of discarding the message and a forwarding action indicative of transmitting the message to the intended recipient process. The method includes performing, by the vehicle computing system, the routing action for the message.

Another example aspect of the present disclosure is directed a computing system including one or one or more processors and one or more tangible, non-transitory, computer readable media. The one or more tangible, non-transitory, computer readable media collectively store instructions that when executed by the one or more processors cause the computing system to perform operations. The operations include obtaining a message. The message is associated with an intended recipient process running onboard the autonomous vehicle. The operations include determining a message type for the message. The message type is indicative of an action associated with the message. The operations include obtaining a computing system state associated with an autonomous vehicle. And, the operations include determining a routing action based on the message type and the computing system state. The routing action is determined from a plurality of routing actions that include a discarding action indicative of discarding the message and a forwarding action indicative of transmitting the message to the intended recipient process.

Yet another example aspect of the present disclosure is directed to an autonomous vehicle including one or more communication interfaces, a signature verification plugin, one or more processors, and one or more tangible, non-transitory, computer readable media that collectively store instructions that when executed by the one or more processors cause the one or more processors to perform operations. The operations include obtaining, at the signature verification plugin, a computing system state associated with the autonomous vehicle. The operations include obtaining, via the one or more communication interfaces, a message. The message is associated with an intended recipient process running on the autonomous vehicle. The operations include determining, via the signature verification plugin, an originating sender of the message. The originating sender is a remote process that generated the message. And, the operations include determining, via the signature verification plugin, a routing action for the message based on a comparison of the originating sender and the computing system state. The routing action is determined from a plurality of routing actions that include a discarding action indicative of discarding the message or a forwarding action indicative of transmitting the message to the intended recipient process.

Other example aspects of the present disclosure are directed to other systems, methods, vehicles, apparatuses, tangible non-transitory computer-readable media, and devices for filtering messages. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 13 depicts example system components according to example embodiments of the present disclosure.

DETAILED DESCRIPTION

Figure 1:
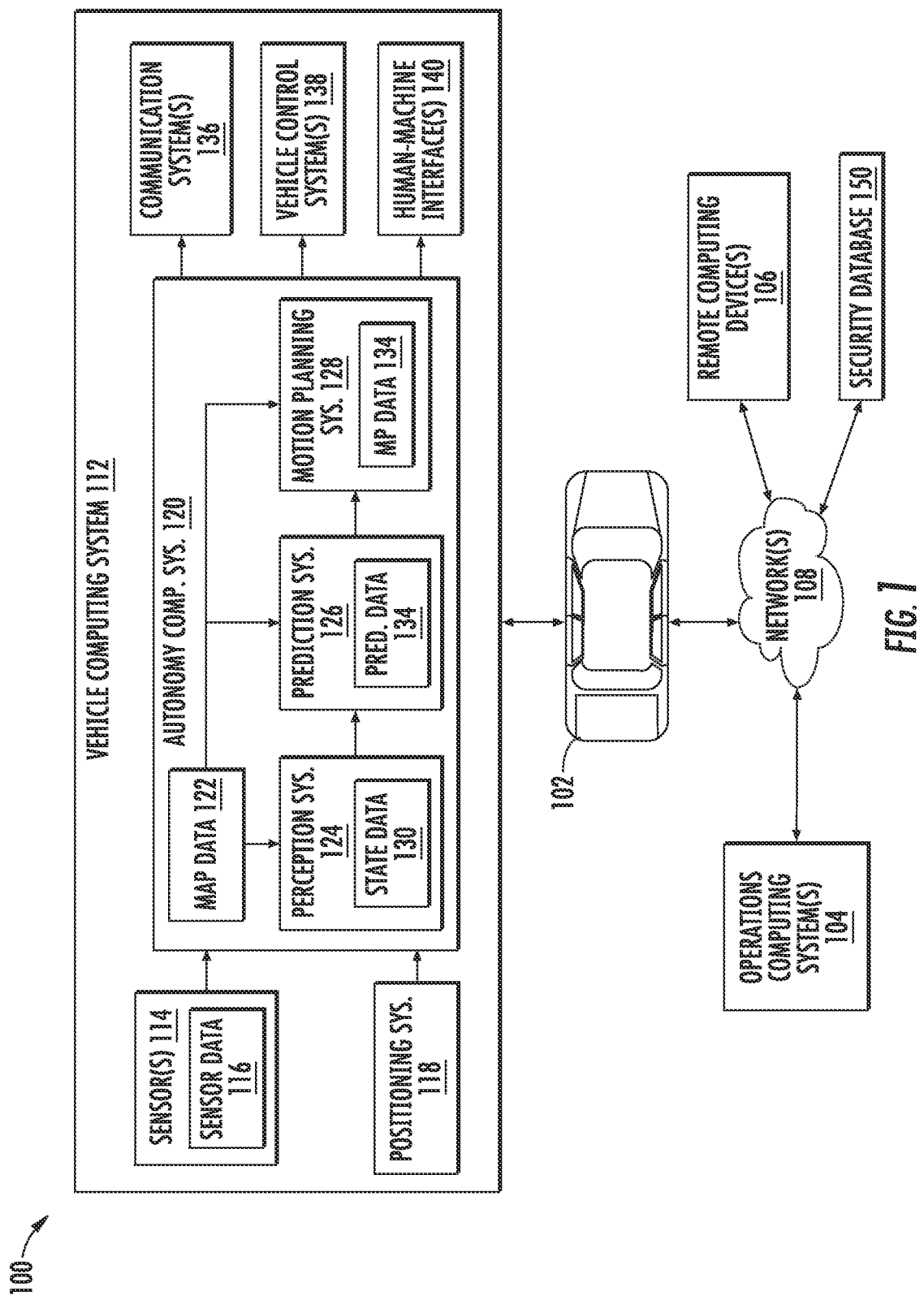
FIG. 1 depicts a diagram of an example system according to example embodiments of the present disclosure.

Aspects of the present disclosure are directed to improved systems and methods for routing messages such as, for example, routing messages between one or more processes of an autonomous vehicle. For instance, a computing system of an autonomous vehicle can include a plurality of devices (e.g., physically-connected devices, wirelessly-connected devices, virtual devices running on a physical machine, etc.). The computing devices can be associated with, for example, the vehicle's onboard computing system, a laptop/computer utilized by a vehicle operator, an onboard tablet accessible by a rider, etc. Each device can include a compute node configured to run one or more processes. In some implementations, a process can include a plurality of function nodes (e.g., pure functions) connected by one or more directed edges that dictate the flow of data between the plurality of function nodes. A device can execute (e.g., via one or more processors, etc.) a respective plurality of function nodes to run a respective process. The plurality of processes can be collectively configured to perform one or more tasks or services of the computing system. To do so, the plurality of processes can be configured to communicate (e.g., send/receive messages) with each other over one or more communication channels (e.g., wired and/or wireless networks).

The vehicle computing system can receive a plurality of messages from remote processes running on a plurality of remote devices (e.g., compute nodes physically and/or located remote from the autonomous vehicle). The messages can each designate a recipient process running on the vehicle computing system (e.g., a compute node physically and/or virtually located on the autonomous vehicle). The relevance of each message to the recipient process can depend on aspects of the message and various states of the autonomous vehicle, the recipient process, and/or the vehicle device running the recipient process. The vehicle computing system of the present disclosure can inspect and filter each message based on its relevance before routing the message to the recipient process. To do so, the vehicle computing system can include communication interfaces with a signature verification plugin configured to inspect each message before determining a routing action for the message. The signature verification plugin can obtain state data from a security manager configured to maintain a current blueprint indicative of the state of the autonomous vehicle at a current time. The current blueprint can include current state information for the autonomous vehicle, the vehicle computing system, vehicle devices of the vehicle computing system, processes running on the vehicle devices of the vehicle computing system, etc. The signature verification plugin can compare one or more aspects of the message (e.g., originating sender, message type, recipient process, message priority, etc.) to the state data and, based on the comparison, determine a routing action (e.g., discard, forward, log an error, etc.) for the message. By way of example, the vehicle computing system can receive a message requesting the vehicle to unlock one or more doors and designating a vehicle action process running on the vehicle computing system to service the request. The signature verification plugin can receive the message and determine, based on the state data, that unlocking the doors is prohibited because the autonomous vehicle is in a driving mode. In response, the signature verification plugin can discard the message before the message is routed to the vehicle action process.

In addition, the signature verification plugin can filter a message based on an originating sender of the message. For instance, the computing system can receive a message including an encrypted signature (e.g., encrypted via one or more cryptographic signing schemes) indicative of the remote process that generated the message. The signature verification plugin can decrypt the signature to identify the originating sender and determine a routing response based on the originating sender and the state of the autonomous vehicle. By way of example, the vehicle computing system can receive a message intended for a recipient process from an updating process (e.g., a provisioning process). The signature verification plugin can receive the message and determine, based at least in part on the state data, that updates are prohibited because the autonomous vehicle is deployed (e.g., completing a service request by driving on a road, parking at a parking location, waiting to pick up a passenger, etc.). In response, the signature verification plugin can discard the messages from the updating process before the message is routed to the recipient process. In this manner, the vehicle computing system can efficiently filter messages based on the context to the vehicle (e.g., and/or the recipient process) and the message. This, in turn, can reduce network congestion by discarding redundant messages before routing the message through internal networks of the computing system. Moreover, by filtering irrelevant messages at communication interfaces rather than the intended process, the computing system can reduce wasted processing power at the intended process; thereby, allowing the intended process to devote additional computing resources to the needs of the autonomous vehicle.

The following describes the technology of this disclosure within the context of an autonomous vehicle for example purposes only. As described herein, the technology described is not limited to autonomous vehicles and can be implemented within other robotic and computing systems, such as those managing messages from a plurality of remote computing devices.

An autonomous vehicle (e.g., ground-based vehicle, aerial-vehicle, bike, scooter, other light electric vehicles, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment.

More particularly, the autonomous vehicle can include a vehicle computing system with a variety of components for operating with minimal and/or no interaction from a human operator. The vehicle computing system can be located onboard the autonomous vehicle and include one or more sensors (e.g., cameras, Light Detection and Ranging (LIDAR), Radio Detection and Ranging (RADAR), etc.), a positioning system (e.g., for determining a current position of the autonomous vehicle within a surrounding environment of the autonomous vehicle), an autonomy computing system (e.g., for determining autonomous navigation), a communication system (e.g., for communicating with the one or more remote computing systems), one or more vehicle control systems (e.g., for controlling braking, steering, powertrain), a human-machine interface, etc.

The autonomy computing system can include a number of sub-systems that cooperate to perceive the surrounding environment of the autonomous vehicle and determine a motion plan for controlling the motion of the autonomous vehicle. For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle.

The vehicle computing system can communicate with a remote computing system such as, for example, an operations computing system and/or a one or more remote devices via the communication system onboard the vehicle. The operations computing system can be associated with a service entity that provides one or more vehicle services. The operations computing system can include various sub-systems/back-ends that are configured to perform various functions. For example, the operations computing system can be configured to receive (e.g., via a matching/deployment system back-end) a service request for a vehicle service, determine (e.g., via a routing system back-end) a vehicle route based on the service request, identify (e.g., via a matching/deployment system back-end) the autonomous vehicle to perform at least a portion of the vehicle route, etc.

In addition, or alternatively, the vehicle computing system can communicate with one or more other remote device(s) such as, for example, one or more operator devices associated with one or more vehicle operators, user devices associated with one or more vehicle passengers, developer devices associated with one or more vehicle developers (e.g., a laptop/tablet computer configured to access computer software of the vehicle computing system), etc.

The autonomous vehicle can be associated with a service entity configured to provide a vehicle service. The operations computing system, for example, can include one or more computing systems configured to carry out the vehicle service for the service entity. The service entity can be associated with a plurality of different vehicles (e.g., the autonomous vehicle) that can be utilized to provide the vehicle service. The plurality of vehicles can include one or more vehicles of different types. For instance, each vehicle can include a vehicle type. The vehicle type can be indicative of the fleet of vehicles to which the vehicle is associated. For example, the vehicle can be included in a fleet of vehicles of the service entity (e.g., first party vehicle) or a fleet associated with a third party entity/vendor (e.g., third party vehicle) that can make the vehicle available to the service entity to perform a vehicle service for the service entity. Additionally, or alternatively, the vehicle type can include one or more operational capabilities of the vehicle (e.g., manual, autonomous, semi-autonomous, etc.). In addition, or alternatively, the vehicle type can be indicative of a make or model of the vehicle. Moreover, in some implementations, the vehicle type can be indicative of the year of the vehicle and/or a version (e.g., software version, etc.) of one or more hardware components of the vehicle and/or software components, such as one or more software containers executed by the of the vehicle.

The service entity can be associated with one or more remote devices configured to facilitate the vehicle service. The one or more remote devices can include, for example, one or more operations computing devices of the operations computing system (e.g., implementing back-end services of the platform of the service entity's system), one or more operator devices configured to facilitate communications between a vehicle and an operator of the vehicle (e.g., an onboard tablet for a vehicle operator, etc.), one or more user devices configured to facilitate communications between the service entity and/or a vehicle of the service entity with a user of the service entity (e.g., an onboard tablet accessible by a rider of a vehicle, etc.), one or more developer computing devices configured to provision and/or update one or more software and/or hardware components of the plurality of vehicles (e.g., a laptop computer of a developer, etc.), one or more bench computing devices configured to generate benchmark statistics based on metrics collected by the autonomous vehicle, one or more simulation computing devices configured to test (e.g., debug, troubleshoot, annotate, etc.) one or more components of the plurality of vehicles, etc.

As discussed above, the vehicle computing system can include a communication system configured to communicate with the one or more remote devices. More particularly, the communications system can include one or more external communication interfaces configured to communicate with the one or more remote computing devices. The external communication interfaces can include, for example, one or more wired communication interfaces (e.g., USB, Ethernet, FireWire, etc.), one or more wireless communication interfaces (e.g., Zigbee wireless technology, Wi-Fi, Bluetooth, etc.), etc. For example, the communication interfaces can establish communications over one or more wireless communication channels (e.g., via local area networks, wide area networks, the Internet, cellular networks, mesh networks, etc.). The one or more channels can include one or more encrypted and/or unencrypted channels. The channels, for instance, can include gRPC messaging. For instance, in some implementations, the channels can include unencrypted channels, encrypted using one or more cryptographic signing techniques (e.g., symmetric signing, asymmetric signing, etc.).

The vehicle computing system can receive a plurality of messages, via the one or more external communication interfaces, from the one or more remote computing devices (e.g., of the operations computing system, remote devices associated with the service entity, etc.). Each message of the plurality of messages can include at least one request. A request can include a request to complete a task such as, for example, to receive information, initiate an operation, etc. as specified by the message. For example, each computing system (e.g., vehicle computing system, operations computing system, etc.) can include a plurality of processes running on a plurality of devices of the computing system. The plurality of processes can be collectively configured to perform one or more tasks or services of the computing system, for example, as requested by a message.

By way of example, the plurality of devices of the computing system can include one or more devices configured to communicate over one or more wired and/or wireless communication channels (e.g., wired and/or wireless networks). Each device can be associated with a type, an operating system, and/or one or more designated tasks. A type, for example, can include an indication of the one or more designated tasks of a respective device. The one or more designated tasks, for example, can include performing one or more processes and/or services of the computing system.

Each device of the plurality devices can include and/or have access to one or more processors and/or one or more memories (e.g., RAM memory, ROM memory, cache memory, flash memory, etc.). The one or more memories can include one or more tangible non-transitory computer readable instructions that, when executed by the one or more processors, cause the device to perform one or more operations. The operations can include, for example, executing one or more of a plurality of processes of the vehicle computing system. For instance, one or more of the devices can include a compute node configured to run one or more processes of the plurality of processes of the vehicle computing system. In some implementations, a process (e.g., of the vehicle computing system) can include a plurality of function nodes (e.g., pure functions) connected by one or more directed edges that dictate the flow of data between the plurality of function nodes. The plurality of function nodes can include a plurality of subroutines configured to carry out one or more tasks for the respective process of the vehicle computing system. Each of the one or more devices can execute (e.g., via one or more processors, etc.) the respective plurality of function nodes to run the respective process.

For example, the plurality of function nodes can be arranged in one or more function graphs. A function graph can include a series of function nodes arranged (e.g., by one or more directed edges) in a pipeline, function graph, etc. The function nodes can include a computing function with one or more inputs (e.g., of one or more data types) and one or more outputs (e.g., of one or more data types). For example, the function nodes can be implemented such that they define one or more accepted inputs and one or more outputs. In some implementations, each function node can be configured to obtain one or more inputs of a single data type, perform a single function, and output one or more outputs of a single data type.

The function nodes can be connected by one or more directed edges of a function graph, a subgraph of the function graph, etc. The one or more directed edges can dictate how data flows through the function graph, subgraph, etc. For example, the one or more directed edges can be formed based on the defined inputs and outputs of each of the function nodes of the function graph. Each function graph can include an injector node and an ejector node configured to communicate with one or more remote devices and/or processes outside the function graph. The injector node, for example, can be configured to communicate with one or more devices (e.g., sensor devices, etc.) and/or processes outside the function graph to obtain input data for the function graph. The ejector node can be configured to communicate with one or more devices and/or processes outside the function graph to provide output data of the function graph to the one or more devices and/or processes.

The one or more computing devices of the vehicle computing system can be configured to execute one or more function graphs to run one or more processes of the plurality of processes. Each process can include an executed instance of a function graph and/or a subgraph of a function graph. For example, in some implementations, a function graph can be separated across multiple processes, each process including a subgraph of the function graph. In such a case, each process of the function graph can be communicatively connected by one or more function nodes of the function graph. In this manner, each respective device can be configured to run a respective process by executing a respective function graph and/or a subgraph of the respective function graph.

Thus, each function graph can be implemented as a single process or multiple processes. In some implementations, one or more of the plurality of processes can include containerized services (application containers, etc.). For instance, each process can be implemented as a container (e.g., docker containers, etc.). For example, the plurality of processes can include one or more containerized processes abstracted away from an operating system associated with each respective device.

The plurality of processes of the computing system (e.g., the plurality of processes of the vehicle computing system, the plurality of processes of the one or more remote devices, etc.) can be communicatively connected over one or more wireless and/or wired networks. For instance, the plurality of processes can communicate over one or more communication channels. Each process can exchange messages over the one or more communicative channels using a message interchange format (e.g., JSON, IDL, etc.). By way of example, each respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. For instance, an originating process running on one or more remote computing devices can be configured to generate a plurality of messages for a recipient process running on the one or more vehicle devices. Each message of the plurality of messages can be associated with the intended recipient process and, for example, can include a request for the intended recipient process.

At times, the vehicle computing system can receive one or more messages that can be inappropriate for the computing system and/or an intended recipient process of the computing system based on one or more factors. For example, a message requesting an update to the system can be inappropriate while the vehicle is on a road. As another example, messages including an intended recipient process that is not currently running on the vehicle may be irrelevant to the vehicle computing system. In addition, in some cases, a message can include a request that is atypical based on the state of the vehicle. For example, the message can request that the vehicle unlock a door while the vehicle is in motion. As discussed herein, the vehicle computing system can increase computing efficiency and overall security by filtering such messages at the communication interface before forwarding the messages to the intended recipient process associated with the message.

For instance, the vehicle computing system can include a signature verification plugin configured to receive a message and determine a routing action for the message based on one or more factors. For example, in some implementations, the signature verification plugin can include a plugin (e.g., a gRPC plugin) configured to inspect one or more messages sent via a gRPC communication. The signature verification plugin can include and/or be a component of the one or more communication interface(s) of the computing system. For instance, the signature verification plugin can include and/or have access to one or more processors and one or more tangible, non-transitory, computer readable media that collectively store instructions that when executed by the one or more processors cause the signature verification plugin to perform operations. For example, the signature verification plugin can include and/or have access to one or more processors and/or memories of the vehicle computing system, one or more communication interface(s) of the vehicle computing system, etc. The signature verification plugin can be configured to inspect the plurality of messages and filter the plurality of messages based on one or more factors before transmitting the messages to the intended recipients of the messages.

The vehicle computing system (e.g., the signature verification plugin) can filter the plurality of messages based, at least in part, on the state of the computing system. To do so, the vehicle computing system (e.g., the signature verification plugin, etc.) can obtain a computing system state associated with the computing system. The computing system state can include contextual information for the vehicle, vehicle computing system, one or more devices of the vehicle computing system, one or more processes running on the one or more devices, etc. The computing system state can include the operational state of the computing system (e.g., an operating mode (e.g., full autonomy mode), a current vehicle task/assignment, maintenance requirements, etc.) and/or a more granular overview of one or more processes and/or applications of the vehicle computing system. For example, the computing system state can include application level knowledge of the vehicle computing system such as, for example, which processes/applications are running/busy/waiting on the vehicle computing system at any given time. In this manner, the signature verification system can utilize the computing system state to make application informed decisions when filtering incoming messages.

For example, the computing system state can include dynamic and/or static data. The dynamic data can include data indicative of an operational status of the computing system and/or one or more processes running on the computing system at any given time. For instance, the data can include an indication of a general operational status (e.g., busy, waiting, starting up, maintenance, deployed, etc.) and/or a specific operational status. A specific operational status, for example, can include an indication of specific processes (e.g., a queue of processes, a list of concurrently running processes, etc.) running on a computing device, tasks (e.g., a queue of tasks) being completed by a process, a length time for which the process has been running, etc.

By way of example, an operational status of the one or more processes running on the computing system can include one or more process operational modes. For instance, the one or more process operational modes can include an off mode, running mode, calibration mode, unknown mode, busy mode, idle mode, etc. The running mode and off modes, for example, can indicate that a respective process is turned on/off, respectively. The calibration mode can be indicative of a process starting up and/or undergoing maintenance (e.g., downloading updates, etc.). The busy/idle modes can indicate whether the process is completing one or more tasks and/or which tasks the process is completing, etc.

In some implementations, the one or more process operational modes can be determined based on one or more operational factors. For example, a process operational mode can be busy and/or idle depending on the bandwidth available to the vehicle computing system at a given time. For instance, if a limited amount of bandwidth is available to the vehicle computing system the vehicle computing system can determine that an otherwise idle process is busy in order to free up bandwidth for higher priority processes. Moreover, a process operational mode can depend on the condition of the autonomous vehicle. For example, one or more processes can be assigned a safety operational mode during a dangerous condition for the autonomous vehicle. For instance, a motion planning process can be assigned a safety operation mode while the autonomous vehicle is operating on a crowded travel way (e.g., with high vehicle traffic). During the safety operation mode, the process operational mode can be busy for (e.g., non-responsive to, set to ignore, etc.) any message that is not associated with the dangerous condition.

In some implementations, the computing system state can include an indication of a plurality of onboard processes running onboard the computing system. For example, the computing system state can include a catalogued list of each of the computing devices of the vehicle computing system and processes running on each of the computing devices. In addition, or alternatively, the computing system state can include at least one operational mode for each of the plurality of processes.

The static data can include information for the vehicle computing system that is not dependent on time. For instance, the static data can include data indicative of the type and/or capabilities of the vehicle computing system (e.g., available hardware, operating system, etc.). For example, the static data can include, configuration data indicative of at least one of a computing system type, computing system capabilities, or a hardware class associated with the computing system. By way of example, the static data associated with the autonomous vehicle can include vehicle configuration data indicative of a vehicle autonomy type (e.g., manual, autonomous, semi-autonomous, etc.), a vehicle configuration type (e.g., make, model, year, etc.), vehicle capabilities (e.g., level of automation, transportation capabilities, etc.), a vehicle class (e.g., version of software, type of hardware, etc.), etc.

In some implementations, the static data can depend on one or more factors. For example, the autonomous vehicle can be associated with a rollout procedure during which the vehicle is provisioned with one or more onboard computing resources. During the rollout procedure the vehicle can be built/modified/unfitted, a vehicle computing system can be created/programmed for the vehicle, and the system can be integrated into the vehicle in one or more steps, at the end of which the vehicle can be ready for deployment. For instance, a vehicle computing system can be integrated into the vehicle in one or more stages. At each stage, a portion of the vehicle computing system (e.g., one or more sensors, one or more portions of the autonomous system, a communications system, etc.) can be integrated into the vehicle, tested, and validated according to safety standards. The configuration of the vehicle commuting system can depend on the stage of the vehicle during the rollout procedure.

In addition, or alternatively, one or more components of the vehicle computing system can be replaced and/or updated throughout the life of the vehicle. For example, hardware components can be replaced as hardware classes are released. Moreover, software components can be updated as updated classes of software become available. In some implementations, the static data of the autonomous vehicle can depend on the class of hardware and/or software currently installed on the autonomous vehicle.

The vehicle computing system (e.g., a security manager of the computing system, the signature verification plugin, etc.) can maintain a current blueprint of the vehicle indicative of the computing system state at a current time. For example, maintaining the current blueprint can include receiving the dynamic data (e.g., during operation of the vehicle) and static data (e.g., during one or more provisioning operations of the computing system, etc.) associated with the vehicle computing system. For instance, the vehicle computing system can communicate with one or more processes running onboard the vehicle computing system to determine the dynamic and/or static data. The vehicle computing system can store the data in one or more memories of the computing system (e.g., memories onboard the vehicle, remote from the computing system, etc.).

By way of example, the vehicle computing system can include a security manager configured to collect and maintain the current blueprint of the autonomous vehicle. For example, the security manager can include one or more processors and/or one or more memory devices onboard the vehicle computing system. The security manager can be configured to receive internal messages from one or more processes running on the vehicle computing system and update the current blueprint based on the internal messages. For example, the internal messages can include an indication of one or more state changes associated with the vehicle computing system and/or one or more processes running on the vehicle computing system. The computing system can maintain the current blueprint of the autonomous vehicle by updating an operational status associated with the vehicle computing system and/or the one or more processes running on the computing system based on the one or more state changes.

In some implementations, the security manager can receive messages signed by the originating sender of the message. For example, the originating sender of the message can include a process running on the vehicle computing system that generated the message. In such a case, the security manager can identify the originating sender of the message and determine whether to update the current blueprint of the autonomous vehicle with the state change of the message based on the originating sender. For example, the security manager can ignore a state change to a first process requested by a message in the event that the message is generated by another process different from the first process. By way of example, the security manager can ignore a message from a vehicle action process that requests a state change for an object detection process. In this manner, the security manager can maintain a current blueprint that accurately portrays the current computing system state of the autonomous vehicle.

The signature verification plugin can determine one or more routing actions based, at least in part, on the static and/or dynamic data as indicated by the current blueprint (e.g., the current computing system state). The one or more routing actions can be determined from a plurality of routing actions that include at least one of a discarding action, a forwarding action, an error logging action, and/or any other action for routing messages at a computing system.

For example, the forwarding action can include transmitting the message to the intended recipient process. For instance, the intended recipient process can include a process running on the vehicle computing system. In response to determining the forwarding action, the communication system of the vehicle computing system can transmit the message to the intended recipient process. In addition, or alternatively, the discarding action can be indicative of discarding the message before it reaches the intended recipient process designated by the message. In the event that the discarding action is determined, the communication system of the vehicle computing system can discard (e.g., delete, junk (e.g., store in a junk memory), etc.) the message instead of transmitting the message to the intended recipient process. In this way, the intended recipient process will not receive the message. In addition, in some implementations, the signature verification system can determine an error logging action. In such a case, the communications system can discard the message and generate an error message indicative of the message and the discarding action. The error message can be stored in one or more memories onboard the vehicle computing system.

The signature verification plugin can determine a respective routing action based on a comparison of the computing system state (e.g., as indicated by the current blueprint) and one or more aspects of a message. For example, the message can be associated with an intended recipient process running on the computing system, a message priority, an originating sender, a signature, and/or a message type. The signature verification plugin can receive the message from at least one remote process running on one or more computing devices remote from the computing system (e.g., operations system computing device, remote computing devices, etc.). The signature verification system can identify one or more aspects of the message, compare the one or more aspects of the message with the current computing system state, and determine a routing action based on the comparison.

For example, the signature verification plugin can identify an intended recipient process for the message. For instance, the message can include the intended recipient process of the message. The intended recipient process can include, for example, a process designated to receive the message. The signature verification plugin can compare the intended recipient process to the current computing system state to determine whether the intended recipient process is running on the vehicle computing system (e.g., based on a catalog of processes running on the vehicle computing system). The signature verification plugin can determine the routing action based on the comparison. By way of example, the signature verification plugin can determine a discarding action in the event that the intended recipient process is not running on the vehicle computing system, and/or vice versa.

In addition, or alternatively, the signature verification plugin can determine an originating sender for the message. For example, the originating sender of the message can include a remote process running on the remote computing device that generated the message. For example, as discussed in greater detail below, the originating sender can be configured to annotate the message with a process identity (e.g., a signature). The signature verification plugin can determine an originating sender for the message based on the annotation.

The signature verification plugin can compare the originating sender to the current vehicle state data. For example, the signature verification plugin can compare the originating sender with one or more current states of the vehicle and/or processes of the vehicle. For instance, one or more of the plurality of remote processes running on the one or more remote devices can be associated with one or more prohibited states and/or permitted states. By way of example, a provisioning process configured to update one or more software components of the vehicle computing system can be associated with one or more prohibited states such as a driving state of the vehicle, a deployed state of the vehicle computing system, a busy state of a process running on the vehicle computing system, etc. In addition, or alternatively, as an example, the provisioning process can be associated with one or more permitted states such as a parked state of the vehicle, an off state of the vehicle computing system, an idle state of the process running on the vehicle computing system, etc.

The signature verification plugin can compare the originating sender to the current computing system state to determine whether one or more permitted and/or prohibited states are present at the time the message is received. The signature verification plugin can determine the routing action based on the comparison. By way of example, the signature verification plugin can determine a discarding action in the event that one or more prohibited states associated with the originating sender are present at the time the message is received and/or a forwarding action in the event one or more permitted states associated with the originating sender are present at the time the message is received.

In some implementations, the signature verification plugin can determine the originating sender based, at least in part, on a signature associated with the message. For example, the message can include a cryptographic signature. The cryptographic signature, for example, can include a process specific identifier (e.g., a unique identifier unique to a specific process) encrypted by one or more cryptographic keys. For instance, the cryptographic signature can be previously generated for the message by the originating sender using one or more cryptographic signing schemes. In such a case, the signature verification plugin can identify the originating sender by decrypting the encrypted signature (e.g., using a corresponding cryptographic signing scheme).

As an example, the signature verification plugin can decrypt the encrypted signature by obtaining a cryptographic key associated with the message and/or the originating sender of the message. In addition, or alternatively, the signature verification plugin can determine a validity of the message based on the cryptographic signature and the cryptographic key. For example, the signature verification plugin can attempt to decrypt (e.g., reconfigure) the signature using the cryptographic key. The signature verification plugin can determine that the cryptographic signature is valid in the event that the decrypted signature identifies a remote process. In addition, or alternatively, the signature verification plugin can determine that the cryptographic signature is invalid in the event that the decrypted signature fails to identify a remote process known to the vehicle computing system.

By way of example, the cryptographic signature can be generated by the originating sender based on a symmetric signing scheme. For instance, the signature can be previously generated for the message by the originating sender based on the one or more shared secrets. For example, the one or more shared secrets can include one or more symmetric private keys (e.g., a 256 bit AES key) known by the vehicle computing system and the remote process.

For example, the security manager can be configured to generate at least one private key for one or more remote devices and/or remote processes running on the one or more remote devices. The private keys can be stored at the security manager and provided to a remote security database. The remote security database, for example, can include one or more remote servers and/or secret management processes communicatively connected to the vehicle computing system and the one or more remote devices. The remote security database can receive authorization credentials from a message signing library of the originating process and, in response, provide at least one symmetric private key to the message signing library of the originating process. The message signing library can store the authorization credentials (e.g., in one or more short term memories accessible by the originating process) for use by the originating process.

The originating sender (e.g., via the message signing library) can sign the message with a process specific identifier. The process specific identifier can be encrypted by the symmetric private key to generate a cryptographic signature. The signed message can be provided to the signature verification plugin. For example, in some implementations, the remote device can include a relay service configured to provide the signed message to the signature verification plugin of the vehicle computing system. The signature verification plugin can identify the cryptographic signature and, in response, receive a corresponding symmetric private key stored at the security manager. The signature verification plugin can decrypt the cryptographic signature of the message with the corresponding symmetric private key. The signature verification plugin can verify the signature associated with the message based, at least in part, on the decrypted signature.

As another example, the cryptographic signature can be generated by the originating sender based on an asymmetric signing scheme. For example, the remote security database can be configured to generate a root certificate and private key corresponding to the root certificate. The root certificate can include a publicly accessible key corresponding to the private key such that a signature encrypted by the private key can be decrypted by the public key, and/or vice versa. The remote security database can utilize the root certificate and/or private key to sign an intermediate certificate associated with one or more intermediate signing services running at the security database and/or on one or more remote devices. The intermediate signing services can utilize the intermediate certificate to sign operational certificates for one or more processes running at the security database and/or remote devices. In this manner, a certificate authority chain can be created in which one or more processes running at the security database and/or remote devices are authorized by an intermediate certificate that derives authority from the root certificate.

More particularly, the security database (and/or a security service running at the security database) can generate a root certificate and root private key corresponding to the root certificate. The security database can provide the root certificate to the vehicle computing system. The vehicle computing system can store the root certificate in one or memories of the vehicle computing system (e.g., at the security manager).

The security database can provide asymmetric keys (e.g., intermediate certificates signed using the root certificate and corresponding private keys) to one or more remote signing services for each of the one or more remote devices. For instance, each remote signing service that is authorized (e.g., preauthorized, associated with authorized user credentials, etc.) to communicate with the vehicle computing system can include a security database token. The remote signing service can use the security database token to request an intermediate certificate and corresponding private key from the security database (e.g., at startup of the vehicle, at every 24 hour interval, etc.). The security database can validate the security database token (e.g., via an LDAP, stored credentials, etc.) and provide the intermediate certificate and corresponding private key to the remote signing service in response to the validation.

The remote signing services can generate operational certificates for a remote process running on a remote device, sign the operational certificate, and encrypt the signature with the private key corresponding to the intermediate certificate. The remote process can generate a message including the signed operational certificate and send the message to the vehicle computing system. The vehicle computing system (e.g., signature verification plugin) can receive the message and identify the remote signing service that signed the operational certificate of the message. The vehicle computing system (e.g., signature verification plugin) can obtain the intermediate certificate (e.g., including the public key corresponding to the private key) of the remote signing service from the remote security database and decrypt the cryptographic signature of the operational certificate using the public key of the intermediate certificate. The signature verification plugin can verify the signature associated with the message based on the decrypted signature.

In some implementations, the signature verification plugin can determine the routing action for the message based on a validity of the cryptographic signature. For example, the signature verification plugin can determine that the signature is valid and, in response, determine a forwarding action for the message. In the event that the signature verification plugin determines that the cryptographic signature is invalid the signature verification plugin can discard the message. In addition, or alternatively, the signature verification plugin can log an error for the message and/or initiate a security response in response to determining that the cryptographic signature is invalid. For example, a security response can include one or more behaviors such as reporting an error, flagging the message, and/or a user-customizable behavior.

The signature verification plugin can determine a message type associated with the message. The message type can be indicative of an action associated with the message. By way of example, the message type can include a respective message type of a plurality of predefined message types. In some implementations, the signature verification plugin can determine the message type of the message based on the originating sender of the message. For example, each of the plurality of predefined message types can be associated with at least one of the one or more remote processes.

In addition, or alternatively, the vehicle computing system can determine the message type based on the content of the message. For example, the signature verification plugin can determine the message type based on a request associated with the message. As examples, a message including a request to update one or more processes of the vehicle computing system can be assigned a provisioning message type, a message including a request to open one or more doors of the vehicle can be assigned a vehicle action message type, a message including information for an upcoming assignment for the vehicle can be assigned an assignment message type, etc.

The signature verification plugin can determine the routing action for the message based on a comparison of the message type and the current computing system state (e.g., as indicated by the current blueprint). For example, the signature verification plugin can compare the message type with one or more current states of the vehicle and/or processes of the vehicle. For instance, each message type can be associated with one or more prohibited states and/or permitted states. By way of example, a provisioning message type can be associated with one or more prohibited states such as a driving state of the vehicle, a deployed state of the vehicle computing system, a busy state of a process running on the vehicle computing system, etc. In addition, or alternatively, as an example, the provisioning message type can be associated with one or more permitted states such as a parked state of the vehicle, an off state of the vehicle computing system, an idle state of the process running on the vehicle computing system, etc.

The signature verification plugin can compare the message type to the current computing system state to determine whether one or more permitted and/or prohibited states are present at the time the message is received. The signature verification plugin can determine the routing action based on the comparison. By way of example, the signature verification plugin can determine a discarding action in the event that one or more prohibited states associated with the message type are present at the time the message is received and/or a forwarding action in the event one or more permitted states associated with the message type are present at the time the message is received.

In addition, or alternatively, the signature verification plugin can compare the message type of the message with an originating sender of the message. In such a case, the signature verification plugin can determine the routing action for the message based on a comparison of the message type and the originating sender. By way of example, a remote process (e.g., a provisioning process) can be associated with at least one message type (e.g., a provisioning message type) that the remote process is expected to generate. The signature verification plugin can compare the message type of the message to the originating sender of the message to determine whether the originating sender is expected to generate the type of message received. By way of example, a remote assistance service can be expected to generate a request for live sensor data indicative of the vehicle's environment and instructions to safely pass an object in an oncoming lane that is free of any objects. The signature verification plugin can determine (at least in part) to forward the message in the event the message type is expected from the originating sender and/or discard the message in the event the message type in not expected from the originating sender.

In some implementations, the signature verification plugin can determine a message priority associated with the message. The message priority, for example, can identify a priority level of the message with respect to other messages received by the vehicle computing system. The priority level of the message can include at least one of one or more predefined priority levels such as a first priority level (e.g., a safety critical priority level), a second priority level (e.g., an intermediate priority level), a third priority (e.g., a basic priority level), etc.

The message priority can be included in the message and/or determined by the signature verification system. For example, the message priority can be determined and included in the message by the originating sender. In addition, or alternatively, the signature verification plugin can determine a message priority for the message based on the message type, the originating sender, the content of the message, and/or one or more other aspects of the message. By way of example, the signature verification plugin can determine a third priority level for a request to obtain a current mileage for the vehicle, a second priority level to a request to unlock the vehicle doors, and/or a first priority level to a request to initiate an emergency stop.

The signature verification plugin can determine the routing action based on a comparison of the computing system state and the message priority. For example, the signature verification plugin can compare the message priority with one or more current states of the vehicle and/or processes of the vehicle. For instance, each message priority can be associated with one or more prohibited states and/or permitted states. By way of example, a first priority level can be permitted during any current state of the vehicle, vehicle computing system, and/or processes running on the vehicle computing system, whereas a third priority level can be prohibited during a driving state of the vehicle, a deployed state of the vehicle computing system, a busy state of a process running on the vehicle computing system, etc.

The signature verification plugin can compare the message priority to the current computing system state to determine whether one or more permitted and/or prohibited states are present at the time the message is received. The signature verification plugin can determine the routing action based on the comparison. By way of example, the signature verification plugin can determine that one or more processes of the vehicle computing system are busy due to low bandwidth. In response, the signature verification plugin can determine a forwarding action in the event that the message is associated with first priority level (e.g., a safety critical message) and/or a discarding action in the event that the message is associated with a third priority level (e.g., a non-safety critical message). In this manner, the signature verification plugin can determine a routing action for a message that to accommodates performance differences in the current environment of the vehicle.

In some implementations, the signature verification plugin can generate metrics data based on the routing action. The metrics data, for example, can include an indication of the originating sender, the intended recipient, the computing system state, the routing action, etc. The signature verification plugin can provide the metrics data to one or more internal and/or external processes associated with the vehicle computing system. The signature verification system and/or the one or more internal/remote processes can store the metrics data on one or more internal memory devices of the vehicle computing system and/or remote memory device of the one or more remote computing devices. The metrics data can be utilized by the signature verification plugin, one or more devices of the vehicle computing system, and/or one or more remote computing devices. For instance, the signature verification plugin can determine a reliability score of one or more remote processes of the computing system based, at least in part, on the metrics data. The reliability for a respective remote process, for example, can indicate whether messages received from the respective process are trustworthy. By way of example, a respective process can be less trustworthy based on a history of corrupting messages. The signature verification plugin can be configured to forward a message received from a remote process with reliability score over a reliability threshold and discard a message from a remote process with a reliability score under the reliability threshold.

Example aspects of the present disclosure can provide a number of improvements to communication computing technology and robotics computing technology such as, for example, communication filtering computing technology for autonomous vehicles. For instance, the systems and methods of the present disclosure can provide an improved approach for filtering messages received by an autonomous vehicle. For example, a vehicle computing system can obtain a computing system state associated with the vehicle computing system. The vehicle computing system can obtain a message from at least one remote process of one or more remote processes running on one or more computing devices remote from the vehicle computing system. The message cam be associated with an intended recipient process running on the vehicle computing system. The vehicle computing system can determine an originating sender for the message. The originating sender can be indicative of a remote process of the one or more remote processes that generated the message. And, the vehicle computing system can determine a routing action for the message based on a comparison of the originating sender and the computing system state. The routing action, for example, can include a discarding action indicative of discarding the message or a forwarding action indicative of transmitting the message to the intended recipient process. In this manner, the present disclosure presents an improved computing system that can effectively filter messages before the messages are routed to an intended recipient process of the autonomous vehicle. The computing system employs improved filtering techniques that leverage different aspects of received messages and the state of the vehicle to apply application level filtering. As a result, the computing system is able to increase the speed and efficiency of computing systems, generally, and autonomous vehicle systems, in particular, by identifying and discarding redundant or inappropriate messages.

Moreover, by maintaining a current blueprint indicative to the current state of the vehicle computing system and one or more processes running on the vehicle computing system, the computing system is able to filter messages based on the context of the autonomous vehicle. In this manner, the computing system can accumulate and utilize newly available information such as, for example, current autonomous vehicle state data to provide a practical improvement to message filtering technology. This, in turn, improves the functioning of communications systems in general by decreasing the network traffic routed through internal communication channels of the communication systems. Ultimately, the filtering techniques disclosed herein result in reduced network congestion; thereby increasing bandwidth available to autonomous vehicle computing systems.

Furthermore, although aspects of the present disclosure focus on the application of message filtering techniques described herein to communication systems utilized in autonomous vehicles, the systems and methods of the present disclosure can be used to filter messages on any computing system. Thus, for example, the systems and methods of the present disclosure can be used to filter messages based on the aspects of a message and the state of any type of computing system.

Various means can be configured to perform the methods and processes described herein. For example, a computing system can include state obtaining unit(s), message obtaining unit(s), originating sender unit(s), message type unit(s), routing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., state obtaining unit(s), etc.) can be configured to obtain a computing system state associated with a vehicle computing system.

The means (e.g., message obtaining unit(s), etc.) can be configured to obtain a message from at least one remote process of one or more remote processes running on one or more computing devices remote from the vehicle computing system. The message can be associated with an intended recipient process running on the vehicle computing system.

The means (e.g., originating sender unit(s), etc.) can determine an originating sender for the message. The originating sender can be indicative of a remote process of the one or more remote process that generated the message. The means (e.g., message type unit(s), etc.) can determine a message type for the message. The message type can be indicative of an action associated with the message.

The means (e.g., routing unit(s), etc.) can determine a routing action for the message based on a comparison of the originating sender and the computing system state. In addition, the means (e.g., routing unit(s), etc.) can be configured to determine a routing action based on a comparison of the message type and the computing system state. The routing action can include a discarding action indicative of discarding the message or a forwarding action indicative of transmitting the message to the intended recipient process.

With reference now to FIGS. 1-13, example embodiments of the present disclosure will be discussed in further detail. FIG. 1 depicts an example system 100 overview according to example implementations of the present disclosure. More particularly, FIG. 1 illustrates a vehicle 102 (e.g., an autonomous vehicle, etc.) including various systems and devices configured to control the operation of the vehicle. For example, the vehicle 102 can include an onboard vehicle computing system 112 (e.g., located on or within the vehicle) that is configured to operate the vehicle 102. Generally, the vehicle computing system 112 can obtain sensor data 116 from a sensor system 114 onboard the vehicle 102, attempt to comprehend the vehicle's surrounding environment by performing various processing techniques on the sensor data 116, and generate an appropriate motion plan 134 through the vehicle's surrounding environment.

As illustrated, FIG. 1 shows a system 100 that includes the vehicle 102; a communications network 108; an operations computing system 104; one or more remote computing devices 106; the vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and a security database 150.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or its users to coordinate a vehicle service provided by the vehicle 102. To do so, the operations computing system 104 can communicate with the one or more remote computing devices 106 and/or the vehicle 102 via one or more communications networks including the communications network 108. The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices. The remote computing device(s) 106 can be remote from the vehicle computing system 112, The remote computing device(s) 106 can include, for example, one or more operator devices associated with one or more vehicle operators, user devices associated with one or more vehicle passengers, developer devices associated with one or more vehicle developers (e.g., a laptop/tablet computer configured to access computer software of the vehicle computing system 112), etc. As used herein, a device can refer to any physical device and/or a virtual device such as, for example, compute nodes, a computing blades, hosts, virtual machines, etc. One or more of the devices can receive input instructions from a user or exchange signals or data with an item or other computing device or computing system (e.g., the operations computing system 104).

In some implementations, the one or more remote computing devices 106 can be used to determine and/or modify one or more states of the vehicle 102 including a location (e.g., a latitude and longitude), a velocity, an acceleration, a trajectory, a heading, and/or a path of the vehicle 102 based in part on signals or data exchanged with the vehicle 102. In some implementations, the operations computing system 104 can include the one or more of the remote computing devices 106.

Figure 5:
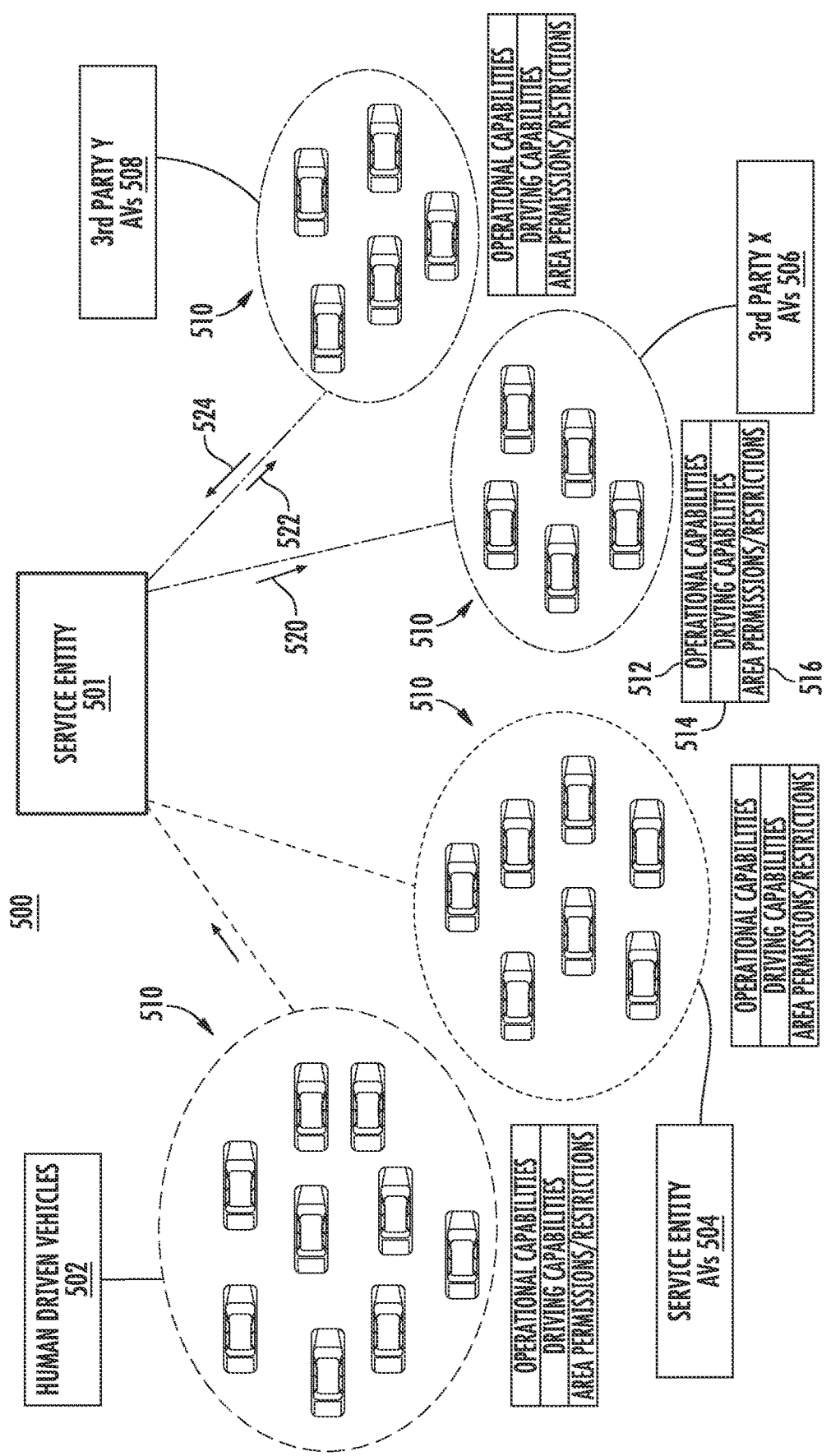
FIG. 5 depicts an example service entities associated with a number of autonomous vehicles according to example implementations of the present disclosure.

In some implementations, as discussed herein with reference to FIG. 5, the one or more remote computing devices can be associate with a service entity configured to facilitate a vehicle service. The one or more remote devices can include, for example, one or more operations computing devices of the operations computing system 104 (e.g., implementing back-end services of the platform of the service entity's system), one or more operator devices configured to facilitate communications between a vehicle and an operator of the vehicle (e.g., an onboard tablet for a vehicle operator, etc.), one or more user devices configured to facilitate communications between the service entity and/or a vehicle of the service entity with a user of the service entity (e.g., an onboard tablet accessible by a rider of a vehicle, etc.), one or more developer computing devices configured to provision and/or update one or more software and/or hardware components of the plurality of vehicles (e.g., a laptop computer of a developer, etc.), one or more bench computing devices configured to generate benchmark statistics based on metrics collected by the vehicle 102, one or more simulation computing devices configured to test (e.g., debug, troubleshoot, annotate, etc.) one or more components of the plurality of vehicles, etc.

In some implementations, the system 100 can include a security database 150. The security database 150 can include, for example, one or more servers communicatively connected to one or more devices (e.g., remote computing devices 106, one or more remote devices of the operations computing system 104, one or more vehicle device of the vehicle computing system 112, etc.) of the system 100. For example, the security database 150 can include one or more processors configured to perform one or more operations. In addition, the security database 150 can include one or more memories (e.g., one or more tangible, non-transitory computer readable media, etc.) configured to store security information such as for example, device credentials, user credentials, etc. For instance, the security database 150 can be associated with one or more users (e.g., users, operators/developers of a service provider, etc.) and/or include one or more user directories including information for the plurality of users (e.g., user identity, credentials, LDAP, etc.). As discussed in further detail here, the security database 150 can be configured to generate and/or otherwise proved one or more unique device credentials to one or more devices of the system 100.

The vehicle 102 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 102 can be an autonomous vehicle that can perform various actions including driving, navigating, and/or operating, with minimal and/or no interaction from a human driver. The vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. As discussed in further detail with reference to FIG. 2, the one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 102 (e.g., its computing system, one or more processors, and other devices in the vehicle 102) to perform operations and/or functions, including those described herein for authenticating messages between processes associated with the vehicle computing system 112.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 102) various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing devices 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 102 around the current and/or predicted locations of one or more objects detected by the one or more sensors 114. The autonomy computing system 120 can control the one or more vehicle control systems 138 to operate the vehicle 102 according to the motion plan.

The autonomy computing system 120 can identify one or more objects that are proximate to the vehicle 102 based at least in part on the sensor data 116 and/or the map data 122. For example, the perception system 124 can obtain state data 130 descriptive of a current and/or past state of an object that is proximate to the vehicle 102. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction generator model. For example, the prediction system 126 can receive state data 130 (e.g., from the perception system 124) associated with one or more objects within the surrounding environment of the vehicle 102. The prediction system 126 can input the state data 130 (e.g., BEV image, LIDAR data, etc.) into the machine-learned prediction generator model to determine trajectories of the one or more objects based on the state data 130 associated with each object. For example, the machine-learned prediction generator model can be previously trained to output a future trajectory (e.g., a future path, one or more future geographic locations, etc.) of an object within a surrounding environment of the vehicle 102. In this manner, the prediction system 126 can determine the future trajectory of the object within the surrounding environment of the vehicle 102 based, at least in part, on the machine-learned prediction generator model.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

By way of example, the communications system 136 can include one or more external communication interfaces configured to communicate with the one or more remote computing devices 106, the operations computing system 104, the security database 150, etc. The external communication interfaces can include, for example, one or more wired communication interfaces (e.g., USB, Ethernet, FireWire, etc.), one or more wireless communication interfaces (e.g., Zigbee wireless technology, Wi-Fi, Bluetooth, etc.), etc. For example, the communication interfaces can establish communications over one or more wireless communication channels (e.g., via local area networks, wide area networks, the Internet, cellular networks, mesh networks, etc.). The one or more channels can include one or more encrypted and/or unencrypted channels. The channels, for instance, can include gRPC messaging. For instance, in some implementations, the channels can include unencrypted channels, encrypted using one or more cryptographic signing techniques (e.g., symmetric signing, asymmetric signing, etc.).

The vehicle computing system 112 can receive a plurality of messages, via the one or more external communication interfaces, from the one or more devices (e.g., of the operations computing system 104, remote computing devices 106, remote devices associated with the service entity, etc.). Each message of the plurality of messages can include at least one request. A request can include a request to complete a task such as, for example, to receive information, initiate an operation, etc. as specified by the message. For example, as discussed herein with reference to FIGS. 2A-B, the system 100 (e.g., vehicle computing system 112, operations computing system 104, remote computing device 106, security database 150, etc.) can include a plurality of processes running on a plurality of devices (vehicle devices of the vehicle computing system 112, remote device remote from the vehicle computing system 112) of the system 100. The plurality of processes can be collectively configured to perform one or more tasks or services of the system 100, for example, as requested by a message.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat). For example, the autonomy computing system 120 can provide one or more outputs including a graphical display of the location of the vehicle 102 on a map of a geographical area within one kilometer of the vehicle 102 including the locations of objects around the vehicle 102. A passenger of the vehicle 102 can interact with the one or more human-machine interfaces 140 by touching a touchscreen display device associated with the one or more human-machine interfaces to indicate, for example, a stopping location for the vehicle 102.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 102. For example, the vehicle computing system 112 can send one or more control signals to activate one or more vehicle systems that can be used to control and/or direct the travel path of the vehicle 102 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 102 (e.g., auditory and/or visual messages about the state or predicted state of objects external to the vehicle 102); braking systems; propulsion systems that can be used to change the acceleration and/or velocity of the vehicle which can include one or more vehicle motor or engine systems (e.g., an engine and/or motor used by the vehicle 102 for locomotion); and/or steering systems that can change the path, course, and/or direction of travel of the vehicle 102.

The following describes the technology of this disclosure within the context of an autonomous vehicle for example purposes only. As described herein, the technology of the present disclosure is not limited to an autonomous vehicle and can be implemented within other robotic and/or other computing systems, such as those managing messages from a plurality of disparate processes.

As an example, the system 100 of the present disclosure can include any combination of the vehicle computing system 112, one or more subsystems and/or components of the vehicle computing system 112, one or more remote computing systems such as the operations computing system 104, one or more components of the operations computing system 104, and/or other remote computing devices 106. For example, each vehicle sub-system can include one or more vehicle device(s) and each remote computing system/device can include one or more remote devices. The plurality of devices of the system 100 can include one or more of the one or more vehicle device(s) (e.g., internal devices) and/or one or more of the remote device(s).

Figure 2A:
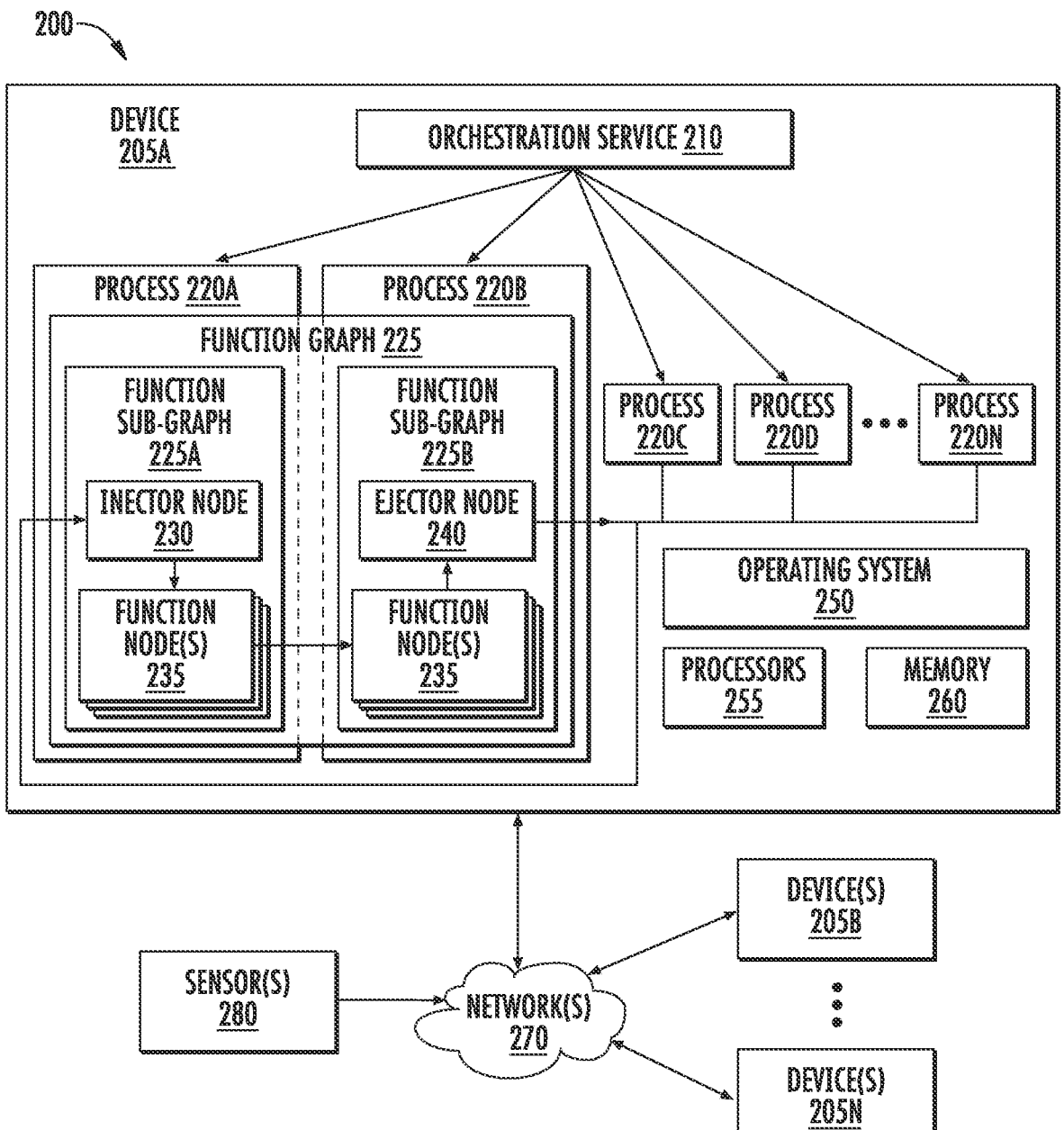
FIG. 2A depicts a diagram of an example system including a plurality of devices configured to execute one or more processes according to example implementations of the present disclosure.

FIG. 2A depicts a diagram of an example computing system 200 including one or more of the plurality of devices (e.g., plurality of devices 205A-N) of the computing system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a series of function nodes 235 arranged (e.g., by one or more directed edges) in a pipeline, graph architecture, etc.

Figure 2B:
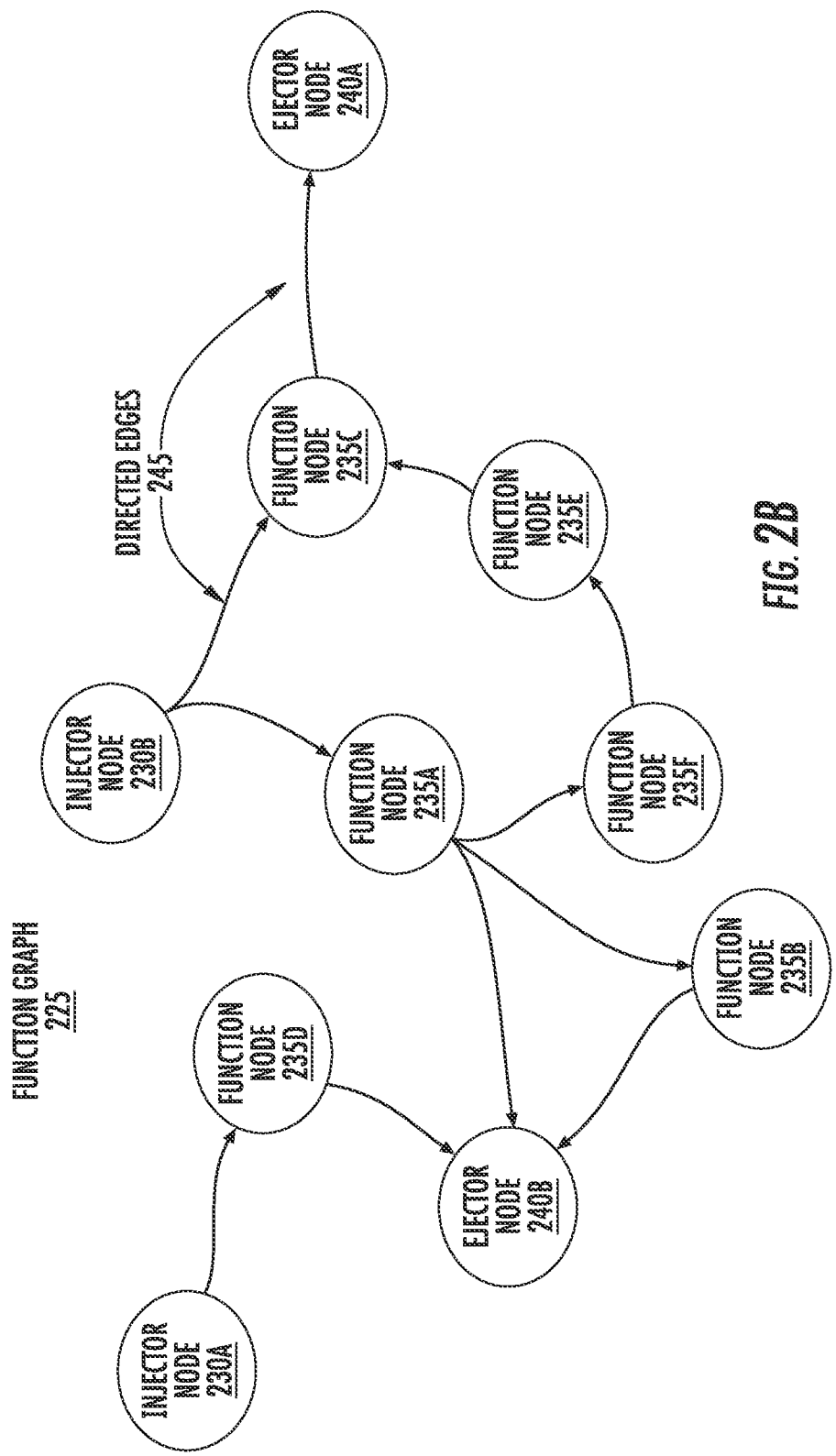
FIG. 2B depicts a diagram of an example functional graph according to example implementations of the present disclosure.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235 can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

The function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. Each function graph 225 can include one or more injector nodes 230A-B and one or more ejector nodes 220A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example, each of the one or more injector nodes 230A-B can include a function configured to obtain and/or process sensor data from a respective sensor 280 shown in FIG. 2A (e.g., sensor(s) 114 of FIG. 1). The ejector nodes 240A-B can be configured to communicate with one or more devices 205B-N and/or processes 220C-220N outside the function graph 225 to provide output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N, etc. of the computing system 200 (e.g., the plurality of processes of the vehicle computing system 112, a plurality of processes of the one or more remote devices, etc.) can be communicatively connected over one or more wireless and/or wired networks 270. For instance, the plurality of devices 205A-N (and/or processes 220A-N of device 205A) can communicate over one or more communication channels 270. Each device and/or process can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. For instance, an originating process running on one or more remote computing devices can be configured to generate a plurality of messages for a recipient process running on the one or more vehicle devices. Each message of the plurality of messages can be associated with the intended recipient process and, for example, can include a request for the intended recipient process.

Turning back to FIG. 1, at times, the vehicle computing system 112 can receive one or more messages that can be inappropriate for the computing system 112 and/or an intended recipient process of the computing system 112 based on one or more factors. For example, a message requesting an update to the system can be inappropriate while the vehicle is on a road. As another example, messages including an intended recipient process that is not currently running on the vehicle 102 may be irrelevant to the vehicle computing system 112. In addition, in some cases, a message can include a request that is atypical based on the state of the vehicle. For example, the message can request that the vehicle unlock a door while the vehicle is in motion. The vehicle computing system 112 can increase computing efficiency and overall security by filtering such messages at the communication interface 136 before forwarding the messages to the intended recipient process associated with the message.

Figure 3:
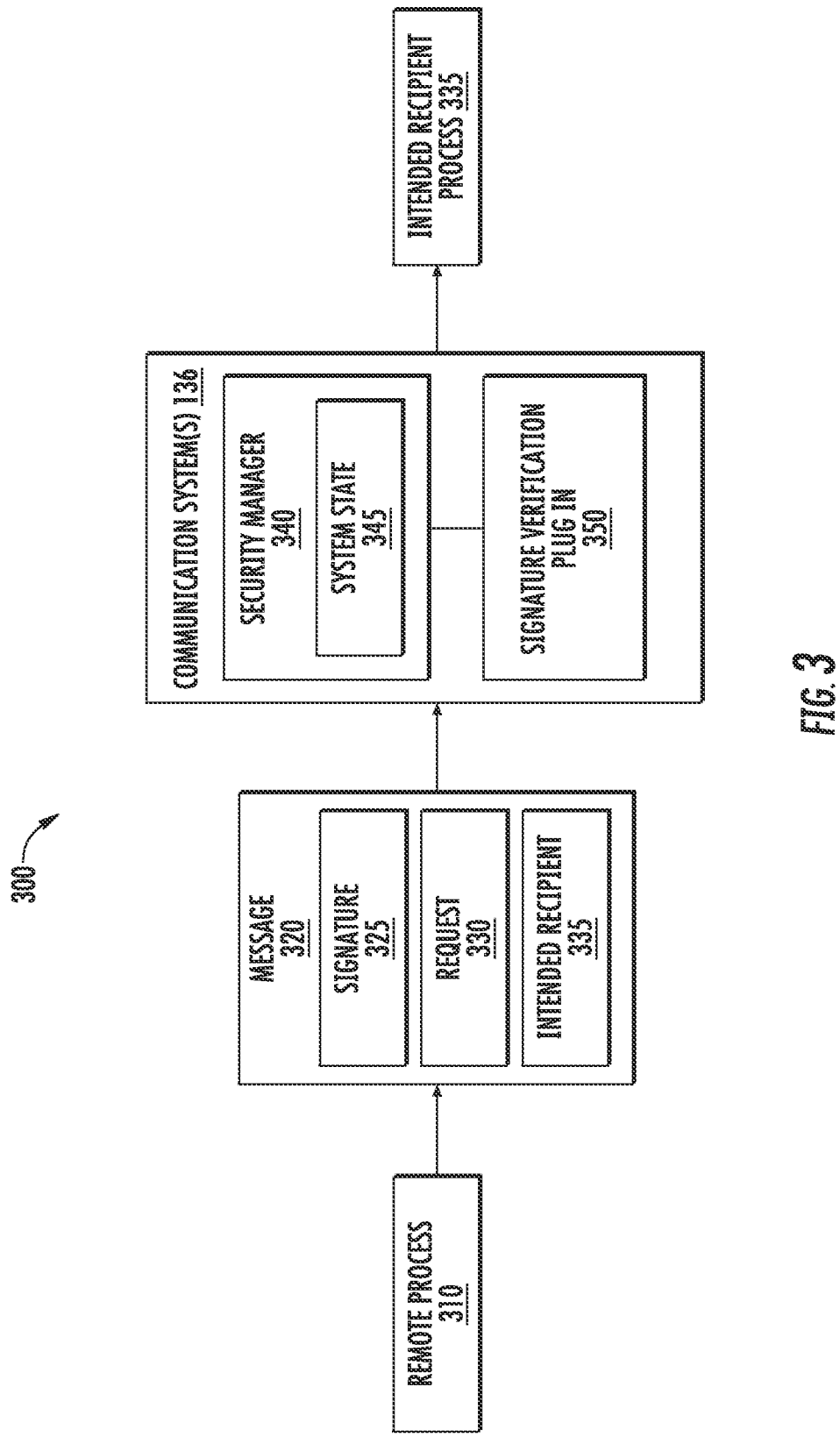
FIG. 3 depicts an example data flow diagram of an example message filtering process according to example implementations of the present disclosure.

FIG. 3 depicts an example data flow diagram of an example message filtering process 300 according to example implementations of the present disclosure. The communication system(s) (e.g., external communication system of the vehicle computing system 112) can include a signature verification plugin 350 and a security manager 340 configured to receive a message 320 from a remote process 310 and determine a routing action for the message 310 based on one or more factors. The message 320, for example, can include at least one of a signature 325, a request 330, an intended recipient process 335, and/or any vehicle message related information.

The signature verification plugin 350 can include a plugin (e.g., gRPC plugin) configured to inspect one or more messages (e.g., message 320) sent via a communication. The signature verification plugin 350 can include and/or be a component of the one or more communication interface(s) 136 of the vehicle computing system 112 of FIG. 1. For instance, the signature verification plugin 350 can include and/or have access to one or more processors and one or more tangible, non-transitory, computer readable media that collectively store instructions that when executed by the one or more processors cause the signature verification plugin 350 to perform operations. For example, the signature verification plugin 350 can include and/or have access to one or more processors and/or memories of the vehicle computing system 112, one or more communication interface(s) 136 of the vehicle computing system 112, etc. The signature verification plugin 350 can be configured to inspect the plurality of messages (e.g., message 320) and filter the plurality of messages based on one or more factors before transmitting the messages to the intended recipient process 335 of the messages.

Figure 4:
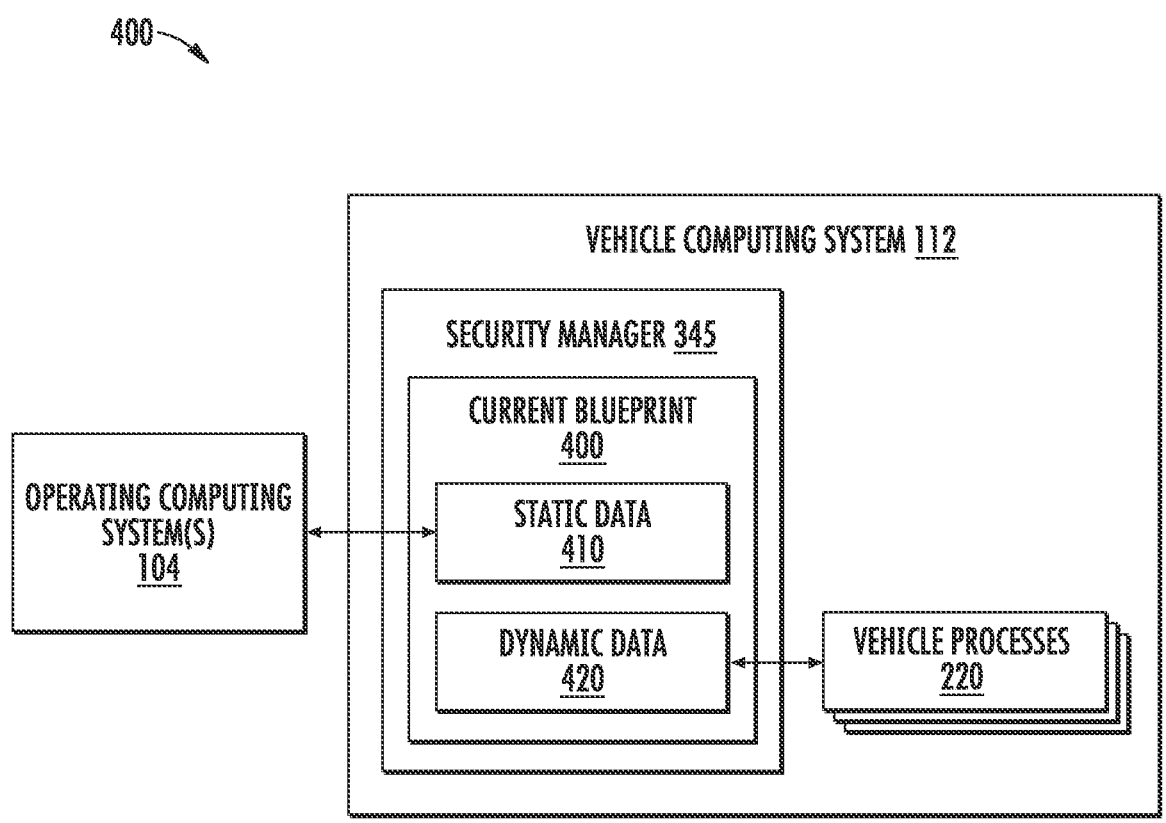
FIG. 4 depicts an example process of maintaining a current blueprint for an autonomous vehicle according to example implementations of the present disclosure.

The vehicle computing system 112 (e.g., the signature verification plugin 350) can filter the plurality of messages (e.g., message 320) based, at least in part, on the state of the computing system. To do so, the vehicle computing system 112 (e.g., the security manager 340, etc.) can obtain a computing system state 345 associated with the computing system. For example, FIG. 4 depicts an example process of maintaining a current blueprint 400 for a vehicle according to example implementations of the present disclosure. The computing system state as indicated by the current blueprint 400 can include contextual information for the vehicle, vehicle computing system 112, one or more devices of the vehicle computing system 112, one or more processes running on the one or more devices, etc. For instance, the current blueprint 400 can include the operational state of the computing system (e.g., an operating mode (e.g., full autonomy mode), a current vehicle task/assignment, maintenance requirements, etc.) and/or a more granular overview of one or more processes and/or applications of the vehicle computing system 112. For example, the current blueprint 400 can include application level knowledge of the vehicle computing system 112 such as, for example, which processes/applications are running/busy/waiting on the vehicle computing system 112 at any given time. In this manner, the signature verification system can utilize the computing system state as indicated by the current blueprint 400 to make application informed decisions when filtering incoming messages.

For example, the computing system state can include dynamic 420 and/or static data 410. The dynamic data 420 can include data indicative of an operational status of the computing system and/or one or more vehicle processes 220 running on the computing system 112 at any given time. For instance, the data 410, 420 can include an indication of a general operational status (e.g., busy, waiting, starting up, maintenance, deployed, etc.) and/or a specific operational status. A specific operational status, for example, can include an indication of specific processes (e.g., a queue of processes, a list of concurrently running processes, etc.) running on a computing device, tasks (e.g., a queue of tasks) being completed by a process, a length time for which the process has been running, etc.

By way of example, an operational status of the one or more vehicle processes 330 running on the vehicle computing system 112 can include one or more process operational modes. For instance, the one or more process operational modes can include an off mode, running mode, calibration mode, unknown mode, busy mode, idle mode, etc. The running mode and off modes, for example, can indicate that a respective process is turned on/off, respectively. The calibration mode can be indicative of a process starting up and/or undergoing maintenance (e.g., downloading updates, etc.). The busy/idle modes can indicate whether the process is completing one or more tasks and/or which tasks the process is completing, etc.

In some implementations, the one or more process operational modes can be determined based on one or more operational factors. For example, a process operational mode can be busy and/or idle depending on the bandwidth available to the vehicle computing system 112 at a given time. For instance, if a limited amount of bandwidth is available to the vehicle computing system 112, the vehicle computing system 112 can determine that an otherwise idle process is busy in order to free up bandwidth for higher priority processes. Moreover, a process operational mode can depend on the condition of the vehicle. For example, one or more processes can be assigned a safety operational mode during a dangerous condition for the vehicle. For instance, a motion planning process can be assigned a safety operation mode while the vehicle is operating on a crowded travel way (e.g., with high vehicle traffic). During the safety operation mode, the process operational mode can be busy for (e.g., non-responsive to, set to ignore, etc.) any message that is not associated with the dangerous condition.

In some implementations, the computing system state can include an indication of a plurality of onboard processes 220 running onboard the vehicle computing system 112. For example, the computing system state can include a catalogued list of each of the computing devices of the vehicle computing system 112 and processes 220 running on each of the computing devices. In addition, or alternatively, the computing system state can include at least one operational mode for each of the plurality of processes 220.

The static data 410 can include information for the vehicle computing system 112 that is not dependent on time. For instance, the static data 410 can include data indicative of the type and/or capabilities of the vehicle computing system 112 (e.g., available hardware, operating system, etc.). For example, the static data 410 can include, configuration data indicative of at least one of a computing system type, computing system capabilities, or a hardware class associated with the vehicle computing system 112. By way of example, the static data 410 associated with the vehicle can include vehicle configuration data indicative of a vehicle autonomy type (e.g., manual, autonomous, semi-autonomous, etc.), a vehicle configuration type (e.g., make, model, year, etc.), vehicle capabilities (e.g., level of automation, transportation capabilities, etc.), a vehicle class (e.g., version of software, type of hardware, etc.), etc.

In some implementations, the configuration data can depend on a service entity associated with a vehicle. By way of example, FIG. 5 depicts example service entities associated with a number of autonomous vehicles according to example implementations of the present disclosure. The vehicle computing system can be associated with at least one vehicle of a service entity 501. The vehicles 510 can include human-driven vehicles 502. In some implementations, the vehicles 510 can include autonomous vehicles of the service entity 504 ("first party autonomous vehicles" or "service entity autonomous vehicles"). In some implementations, the vehicles 510 can be autonomous vehicles of a third party vehicle provider 506/508 ("third party autonomous vehicles"). A third party vehicle provider 506/508 can be, for example, a third party vehicle vendor, operator, manager, etc. that owns, operates, manages, etc. a fleet of third party autonomous vehicles. The third party vehicle provider 506/508 can make its fleet (or a portion of its fleet) of third party autonomous vehicles available to the service entity 501 such that the third party autonomous vehicles are available for performing vehicle services (e.g., to address a service request). Each of the one or more vehicle providers can be associated with one or more fleets of vehicles. In some implementations, each respective vehicle 510 in the plurality of vehicles can be associated with at least one of the one or more fleets of vehicles associated with the one or more vehicle providers.

Each vehicle 510 can be associated with a particular fleet of vehicles based on one or more shared attributes such as, for example, a manufacturer of the vehicle (e.g., make, model, etc.), a type of the vehicle (non-autonomous, autonomous, etc.), a vehicle provider, and/or other factors sufficient to separate the plurality of vehicles. For example, in some implementations, each fleet of vehicles can be associated with one or more operational capabilities 512. For example, each of the one or more fleets of vehicles can be associated with a set of operational capabilities. In some implementations, the operational capabilities 512 of each vehicle 510 in a respective fleet of vehicles can correspond to the set of operational capabilities associated with the respective fleet of vehicles. As further described herein, the operational capabilities 512 of a vehicle 510 and/or a fleet can indicate the capabilities (e.g., autonomy capabilities, etc.) the vehicle 510/fleet is able to perform, the capabilities the vehicle 510/fleet are unable to perform, areas in which the vehicle 510/fleet are able and/or permitted to operate, areas in which the vehicle 510/fleet are unable and/or restricted from operating, etc.

Operational capabilities can include, for example, one or more driving capabilities 514 and/or one or more area permissions 516. The one or more driving capabilities 514, for example, can be indicative of a type of autonomous vehicle and/or a type of driver. For example, the one or more driving capabilities 514 can be indicative of a competence level and/or preference of a driver of a non-autonomous vehicle.

In addition, an autonomous vehicle operational capability can be a feature, function, and/or behavior of the autonomous vehicle. Each of the one or more driving capabilities 514 can be indicative of one or more restricted driving maneuvers the autonomous vehicle is unable to perform and/or one or more autonomous driving maneuvers that autonomous vehicle is able to perform. The operational capabilities 512 can include, for example; speed limits and directions (e.g., conformity to specified speed limits, directions of travel, lane restrictions, etc.); stop and go traffic (e.g., ability to properly handle dense traffic conditions with frequent slow-downs, starts, stops, etc.); turning (e.g., ability to handle left hand turns, unprotected turns, three point turns, U-turns, etc.); parking (e.g., parallel parking, required parking space dimensions, etc.); navigating certain geographic features (e.g., crossing train tracks); traveling in reverse (e.g., backing into a parking space); signaling (e.g., handling turn signal(s) from other objects); nudging (e.g., lateral movement within lane boundaries and/or partially over a lane boundary, etc.); handling jaywalkers; and/or other capabilities of an autonomous vehicle. In some implementations, an operational capability can depend on another operational capability. For example, the autonomous vehicle's ability to handle stop-and-go traffic can depend on its ability to handle speed limits and direction.

The operational capabilities 512 can be included in a pre-defined group (e.g., list, table, etc.) of autonomous vehicle capabilities. For instance, the one or more capabilities can be indicative of a list of capabilities. Each list of capabilities can include one or more maneuvers that the vehicle can safely perform. In some implementations, the absence of a vehicle maneuver from the list of capabilities can be indicative of a restriction. For example, in some implementations, the list of capabilities can be an exhaustive list of driving maneuvers that can be safely performed by a respective vehicle.

In addition, or alternatively, each of the one or more area permissions/restrictions 516 can be indicative of one or more geographic areas in which an autonomous vehicle and/or a non-autonomous vehicle is permitted to travel. For instance, the one or more area permissions 516 can be indicative of autonomous vehicle capabilities such as operating conditions, routes, and/or the like where one or more autonomous vehicles can safely operate. By way of example, the one or more area permissions 516 can be indicative of one or more geographic regions that the autonomous vehicle is mapped to travel within. In some implementations, if an autonomous vehicle does not have access to mapping data describing a geographic region, the autonomous vehicle may not be associated with area permissions 516 indicative of the geographic region. In some implementations, the configuration data can be determined based, at least in part, on the operational capabilities 512, driving capabilities 514, area permissions/restrictions 516, etc. associated with the vehicle of the vehicle computing system.

Turing back to FIG. 4, in some implementations, the static data 410 can depend on one or more other factors. For example, the vehicle can be associated with a rollout procedure during which the vehicle is provisioned with one or more onboard computing resources. During the rollout procedure the vehicle can be built/modified/upfitted, a vehicle computing system 112 can be created/programmed for the vehicle, and the system can be integrated into the vehicle in one or more steps, at the end of which the vehicle can be ready for deployment. For instance, a vehicle computing system 112 can be integrated into the vehicle in one or more stages. At each stage, a portion of the vehicle computing system 112 (e.g., one or more sensors, one or more portions of the autonomous system, a communications system, etc.) can be integrated into the vehicle, tested, and validated according to safety standards. The configuration data of the vehicle commuting system 112 can depend on the stage of the vehicle during the rollout procedure.

In addition, or alternatively, one or more components of the vehicle computing system 112 can be replaced and/or updated throughout the life of the vehicle. For example, hardware components can be replaced as hardware classes are released. Moreover, software components can be updated as updated classes of software become available. In some implementations, the static data 410 of the vehicle can depend on the class of hardware and/or software currently installed on the vehicle.

The vehicle computing system 112 (e.g., a security manager 345 of the computing system 112, the signature verification plugin, etc.) can maintain a current blueprint 400 of the vehicle indicative of the computing system state at a current time. For example, maintaining the current blueprint 400 can include receiving the dynamic data 420 (e.g., during operation of the vehicle) and static data 410 (e.g., during one or more provisioning operations of the computing system, etc.) associated with the vehicle computing system 112. For instance, the vehicle computing system 112 can communicate with one or more processes 220 running onboard the vehicle computing system 112 to determine the dynamic 420 and/or static data 410. The vehicle computing system 112 can store the data in one or more memories of the computing system (e.g., memories onboard the vehicle, remote from the computing system, etc.).

By way of example, the vehicle computing system 112 can include a security manager 345 configured to collect and maintain the current blueprint 400 of the vehicle. For example, the security manager 345 can include one or more processors and/or one or more memory devices onboard the vehicle computing system 112. The security manager 345 can be configured to receive internal messages from one or more processes 220 running on the vehicle computing system 112 and update the current blueprint 400 based on the internal messages. For example, the internal messages can include an indication of one or more state changes associated with the vehicle computing system 112 and/or one or more processes 220 running on the vehicle computing system 112. The vehicle computing system 112 can maintain the current blueprint 400 of the vehicle by updating an operational status associated with the vehicle computing system 112 and/or the one or more processes 220 running on the vehicle computing system 112 based on the one or more state changes.

In some implementations, the security manager 345 can receive messages signed by the originating sender of the message. For example, the originating sender of the message can include a process (e.g., of processes 220) running on the vehicle computing system 112 that generated the message. In such a case, the security manager 345 can identify the originating sender of the message and determine whether to update the current blueprint 400 of the vehicle with the state change of the message based on the originating sender. For example, the security manager 345 can ignore a state change to a first process requested by a message in the event that the message is generated by another process different from the first process. By way of example, the security manager 345 can ignore a message from a vehicle action process that requests a state change for an object detection process. In this manner, the security manager 345 can maintain a current blueprint 400 that accurately portrays the current computing system state of the vehicle.

Turning back to FIG. 3, the signature verification plugin 350 can determine one or more routing actions for a message 320 based, at least in part, on the static and/or dynamic data as indicated by the current blueprint (e.g., the current computing system state 345). The one or more routing actions can be determined from a plurality of routing actions that include at least one of a discarding action, a forwarding action, an error logging action, and/or any other action for routing messages at the vehicle computing system.

For example, the forwarding action can include transmitting the message to the intended recipient process 335. For instance, the intended recipient process 335 can include a process running on the vehicle computing system. In response to determining the forwarding action, the communication system 136 of the vehicle computing system can transmit the message 320 to the intended recipient process 335. In addition, or alternatively, the discarding action can be indicative of discarding the message before it reaches the intended recipient process 335 designated by the message 320. In the event that the discarding action is determined, the communication system 136 of the vehicle computing system can discard (e.g., delete, junk (e.g., store in a junk memory), etc.) the message 320 instead of transmitting the message to the intended recipient process 335. In this way, the intended recipient process 335 will not receive the message. In addition, in some implementations, the signature verification plugin 350 can determine an error logging action. In such a case, the communications system 136 can discard the message 320 and generate an error message indicative of the message 320 and the discarding action. The error message can be stored in one or more memories onboard the vehicle computing system.

Figure 6:
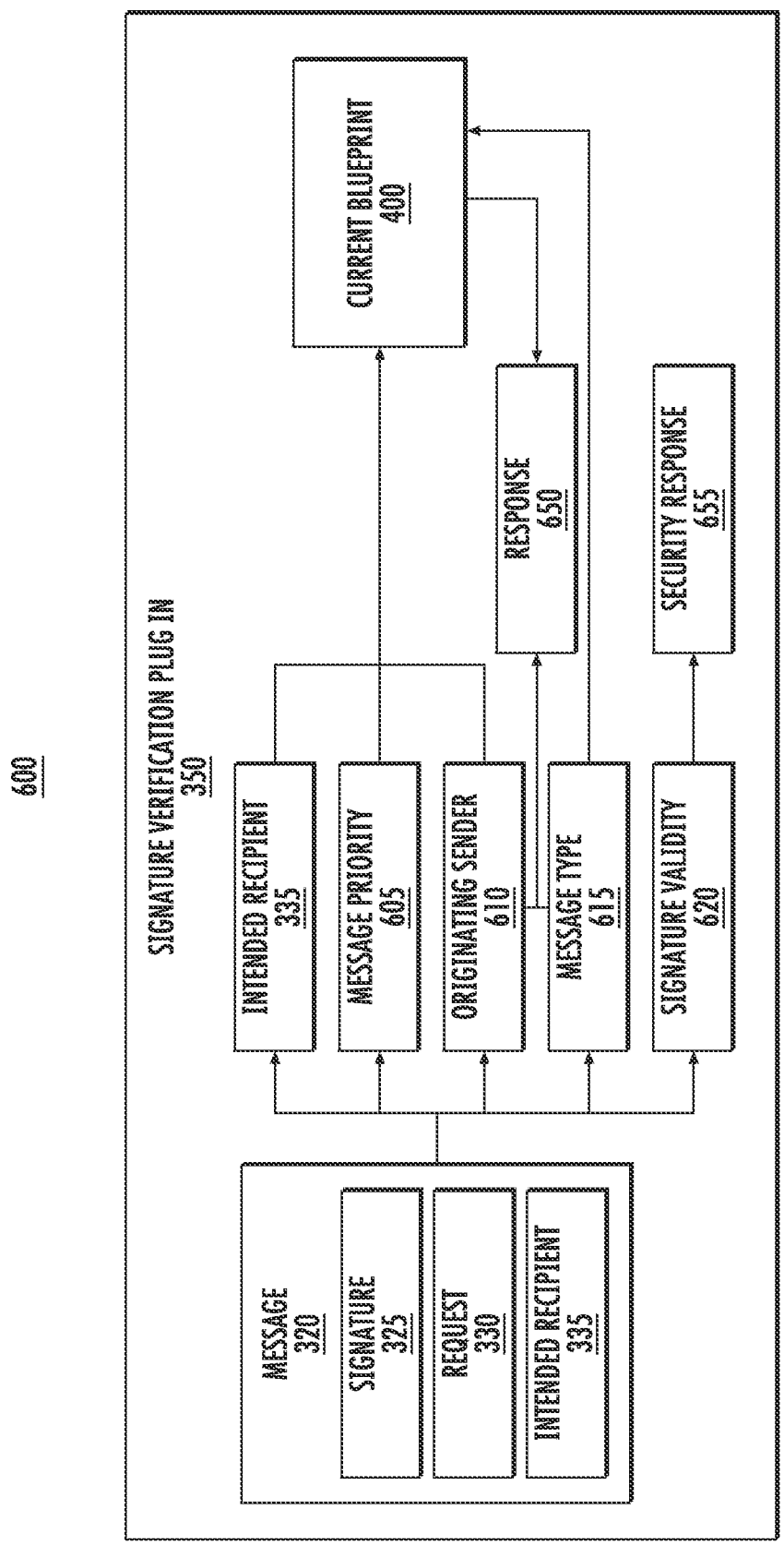
FIG. 6 depicts an example message filtering process based on one or more aspects of the message according to example implementations of the present disclosure.

The signature verification plugin 350 can determine a respective routing action based on a comparison of the computing system state 345 (e.g., as indicated by the current blueprint) and one or more aspects of a message. For example, FIG. 6 depicts an example message filtering process 600 based on one or more aspects of the message according to example implementations of the present disclosure. As depicted, the message 320 can be associated with an intended recipient process 335 running on the computing system, a message priority 605, an originating sender 610, a signature 325, and/or a message type 615. The signature verification plugin 350 can receive the message 320 from at least one remote process running on one or more computing devices remote from the computing system (e.g., operations system computing device, remote computing devices, etc.). The signature verification plugin 350 can identify one or more aspects of the message, compare the one or more aspects of the message with the current blueprint 400, and determine a routing action (e.g., response 650, security response 655, etc.) based on the comparison.

For example, the signature verification plugin 350 can identify an intended recipient process 335 for the message 320. For instance, the message 320 can include the intended recipient process 335 of the message 320. The intended recipient process 335 can include, for example, a process designated to receive the message 320. The signature verification plugin 350 can compare the intended recipient process 335 to the current computing system state as indicated by the current blueprint 400 to determine whether the intended recipient process 335 is running on the vehicle computing system (e.g., based on a catalog of processes running on the vehicle computing system). The signature verification plugin 350 can determine the routing action based on the comparison. By way of example, the signature verification plugin 350 can determine a discarding action (e.g., response 650) in the event that the intended recipient process 335 is not running on the vehicle computing system, and/or vice versa.

In addition, or alternatively, the signature verification plugin 350 can determine an originating sender 610 for the message 320. For example, the originating sender 610 of the message 320 can include a remote process running on the remote computing device that generated the message 320. For example, the originating sender 610 can be configured to annotate the message 320 with a process identity (e.g., a signature 325). The signature verification plugin 350 can determine an originating sender 610 for the message 320 based on the annotation.

The signature verification plugin 350 can compare the originating sender 610 to the current blueprint 400. For example, the signature verification plugin 350 can compare the originating sender 610 with one or more current states of the vehicle and/or processes of the vehicle. For instance, one or more of the plurality of remote processes running on the one or more remote devices can be associated with one or more prohibited states and/or permitted states. By way of example, a provisioning process configured to update one or more software components of the vehicle computing system can be associated with one or more prohibited states such as a driving state of the vehicle, a deployed state of the vehicle computing system, a busy state of a process running on the vehicle computing system, etc. In addition, or alternatively, as an example, the provisioning process can be associated with one or more permitted states such as a parked state of the vehicle, an off state of the vehicle computing system, an idle state of the process running on the vehicle computing system, etc.

The signature verification plugin 350 can compare the originating sender 610 to the current computing system state as indicated by the current blueprint 400 to determine whether one or more permitted and/or prohibited states are present at the time the message 320 is received. The signature verification plugin 350 can determine the routing action (e.g., response 650) based on the comparison. By way of example, the signature verification plugin 350 can determine a discarding action (e.g., response 650) in the event that one or more prohibited states associated with the originating sender 610 are present at the time the message 320 is received and/or a forwarding action (e.g., response 650) in the event one or more permitted states associated with the originating sender 610 are present at the time the message 320 is received.

In some implementations, the signature verification plugin 350 can determine the originating sender 610 based, at least in part, on the signature 325 associated with the message 320. For example, the message 320 can include a cryptographic signature 325. The cryptographic signature 325, for example, can include a process specific identifier (e.g., a unique identifier unique to a specific process) encrypted by one or more cryptographic keys. For instance, the cryptographic signature 325 can be previously generated for the message 320 by the originating sender 610 using one or more cryptographic signing schemes. In such a case, the signature verification plugin 350 can identify the originating sender 610 by decrypting the encrypted signature 325 (e.g., using a corresponding cryptographic signing scheme).

Figure 7:
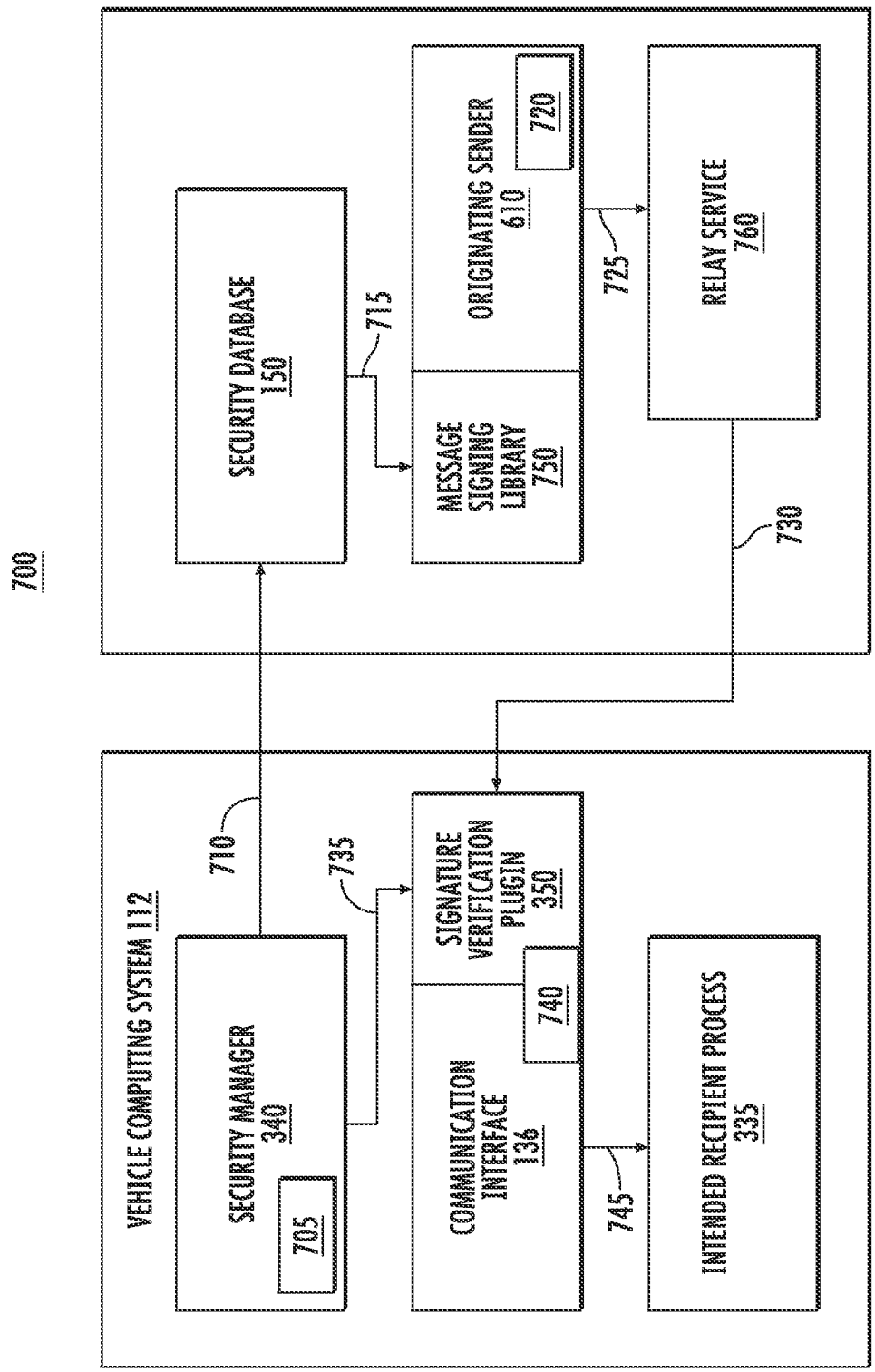
FIG. 7 depicts an example cryptographic message signing process according to example implementations of the present disclosure.

As an example, FIG. 7 depicts an example cryptographic message signing process 700 according to example implementations of the present disclosure. The signature verification plugin 350 can decrypt the encrypted signature by obtaining a cryptographic key, at 735, associated with the message and/or the originating sender 610 of the message. In addition, or alternatively, the signature verification plugin 350 can determine a validity of the message, at 740, based on the cryptographic signature and the cryptographic key. For example, the signature verification plugin 350 can attempt to decrypt (e.g., reconfigure) the signature using the cryptographic key. The signature verification plugin 350 can determine that the cryptographic signature is valid in the event that the decrypted signature identifies a remote process 320. In addition, or alternatively, the signature verification plugin 350 can determine that the cryptographic signature is invalid in the event that the decrypted signature fails to identify a remote process known to the vehicle computing system 112.

By way of example, the cryptographic signature can be generated by the originating sender 610 based on a symmetric signing scheme. For instance, the signature can be previously generated for the message by the originating sender 610 based on the one or more shared secrets. For example, the one or more shared secrets can include one or more symmetric private keys (e.g., a 256 bit AES key) known by the vehicle computing system 112 and the remote process 310.

For example, the security manager 340 can be configured to generate, at 705, at least one private key for one or more remote devices and/or remote processes running on the one or more remote devices. The private keys can be stored at the security manager and provided, at 710, to a remote security database 150. The remote security database 150, for example, can include one or more remote servers and/or secret management processes communicatively connected to the vehicle computing system 112 and the one or more remote devices. The remote security database 150 can receive authorization credentials from a message signing library 750 of the originating sender 610 and, in response, provide, at 715, at least one symmetric private key to the message signing library 750 of the originating sender 610. The message signing library 750 can store the authorization credentials (e.g., in one or more short term memories accessible by the originating sender 610) for use by the originating sender 610.

The originating sender 610 (e.g., via the message signing library 750) can sign, at 720, the message with a process specific identifier. The process specific identifier can be encrypted by the symmetric private key to generate a cryptographic signature. The signed message can be provided, at 730, to the signature verification plugin 350. For example, in some implementations, the remote device can include a relay service 760 (e.g., vehicle platform relay) configured to provide, at 730, the signed message to the signature verification plugin 350 of the vehicle computing system 112. The originating sender 610 can provide, at 725, the signed message to the relay service 760 and the relay service 760 can forward, at 730, the signed message to the signature verification plugin 350. The signature verification plugin 350 can identify the cryptographic signature and, in response, receive a corresponding symmetric private key, at 735, stored at the security manager 340. The signature verification plugin 350 can decrypt, at 740, the cryptographic signature of the message with the corresponding symmetric private key. The signature verification plugin 350 can verify the signature associated with the message based, at least in part, on the decrypted signature.

As another example, the cryptographic signature can be generated by the originating sender 610 based on an asymmetric signing scheme. For example, the remote security database 150 can be configured to generate a root certificate and private key corresponding to the root certificate. The root certificate can include a publicly accessible key corresponding to the private key such that a signature encrypted by the private key can be decrypted by the public key, and/or vice versa. The remote security database 150 can utilize the root certificate and/or private key to sign an intermediate certificate associated with one or more intermediate signing services running at the security database 150 and/or on one or more remote devices. The intermediate signing services can utilize the intermediate certificate to sign operational certificates for one or more processes (e.g., originating sender 610) running at the security database 150 and/or remote devices. In this manner, a certificate authority chain can be created in which one or more processes running at the security database 150 and/or remote devices are authorized by an intermediate certificate that derives authority from the root certificate.

More particularly, the security database 150 (and/or a security service running at the security database 150) can generate a root certificate and root private key corresponding to the root certificate. The security database 150 can provide the root certificate to the vehicle computing system 112. The vehicle computing system 112 can store the root certificate in one or memories of the vehicle computing system 112 (e.g., at the security manager 340). The security database 150 can provide asymmetric keys (e.g., intermediate certificates signed using the root certificate and corresponding private keys) to one or more remote signing services (e.g., message signing library 750) for each of the one or more remote devices. For instance, each remote signing service that is authorized (e.g., preauthorized, associated with authorized user credentials, etc.) to communicate with the vehicle computing system 112 can include a security database token. The remote signing service can use the security database token to request an intermediate certificate and corresponding private key from the security database 150 (e.g., at startup of the vehicle, at every 24 hour interval, etc.). The security database 150 can validate the security database token (e.g., via an LDAP, stored credentials, etc.) and provide the intermediate certificate and corresponding private key to the remote signing service in response to the validation.

The remote signing services can generate operational certificates for a remote process running on a remote device, sign the operational certificate, and encrypt the signature with the private key corresponding to the intermediate certificate. The originating sender 610 can generate a message including the signed operational certificate and send the message to the vehicle computing system 112. The vehicle computing system 112 (e.g., signature verification plugin 350) can receive the message and identify the remote signing service that signed the operational certificate of the message. The vehicle computing system 112 (e.g., signature verification plugin 350) can obtain the intermediate certificate (e.g., including the public key corresponding to the private key) of the remote signing service from the remote security database 150 and decrypt the cryptographic signature of the operational certificate using the public key of the intermediate certificate. The signature verification plugin 350 can verify the signature associated with the message based on the decrypted signature.

In some implementations, the signature verification plugin 350 can determine the routing action for the message based on a validity of the cryptographic signature. For example, the signature verification plugin 350 can determine that the signature is valid and, in response, determine a forwarding action for the message. In such a case, the signature verification plugin 350 can forward, at 745, the message to the intended recipient process 335.

Turning back to FIG. 6, the signature verification plugin 350 can determine that the cryptographic signature 325 is invalid (e.g., signature validity 620). In such a case, the signature verification plugin 350 can discard (e.g., response 650) the message 320. In addition, or alternatively, the signature verification plugin 350 can log an error for the message 320 and/or initiate a security response 655 in response to determining that the cryptographic signature 325 is invalid. For example, a security response 655 can include one or more behaviors such as reporting an error, flagging the message 320, and/or a user-customizable behavior.

The signature verification plugin 350 can determine a message type 615 associated with the message 320. The message type 615 can be indicative of an action associated with the message 320. By way of example, the message type 615 can include a respective message type 615 of a plurality of predefined message types. In some implementations, the signature verification plugin 350 can determine the message type 615 of the message 320 based on the originating sender 610 of the message 320. For example, each of the plurality of predefined message types can be associated with at least one of the one or more remote processes.

In addition, or alternatively, the vehicle computing system can determine the message type 615 based on the content of the message 320. For example, the signature verification plugin 350 can determine the message type 615 based on a request 330 associated with the message 320. As examples, a message 320 including a request 330 to update one or more processes of the vehicle computing system can be assigned a provisioning message type, a message 320 including a request 330 to open one or more doors of the vehicle can be assigned a vehicle action message type, a message 320 including information for an upcoming assignment for the vehicle can be assigned an assignment message type, etc.

The signature verification plugin 350 can determine the routing action (e.g., response 650, 655) for the message 320 based on a comparison of the message type 615 and the current computing system state (e.g., as indicated by the current blueprint 400). For example, the signature verification plugin 350 can compare the message type 615 with one or more current states of the vehicle and/or processes of the vehicle. For instance, each message type 615 can be associated with one or more prohibited states and/or permitted states. By way of example, a provisioning message type can be associated with one or more prohibited states such as a driving state of the vehicle, a deployed state of the vehicle computing system, a busy state of a process running on the vehicle computing system, etc. In addition, or alternatively, as an example, the provisioning message type can be associated with one or more permitted states such as a parked state of the vehicle, an off state of the vehicle computing system, an idle state of the process running on the vehicle computing system, etc.

The signature verification plugin 350 can compare the message type 615 to the current computing system state as indicated by the current blueprint 400 to determine whether one or more permitted and/or prohibited states are present at the time the message 320 is received. The signature verification plugin 350 can determine the routing action (e.g., response 650, 655) based on the comparison. By way of example, the signature verification plugin 350 can determine a discarding action (e.g., response 650) in the event that one or more prohibited states associated with the message type 615 are present at the time the message 320 is received and/or a forwarding action (e.g., response 650) in the event one or more permitted states associated with the message type 615 are present at the time the message 320 is received.

In addition, or alternatively, the signature verification plugin 350 can compare the message type 615 of the message with an originating sender 610 of the message 320. In such a case, the signature verification plugin 350 can determine the routing action (e.g., response 650, 655) for the message 320 based on a comparison of the message type 615 and the originating sender 610. By way of example, a remote process (e.g., a provisioning process) can be associated with at least one message type (e.g., a provisioning message type) that the remote process is expected to generate. The signature verification plugin 350 can compare the message type 615 of the message 320 to the originating sender 610 of the message to determine whether the originating sender 610 is expected to generate the type of message received. By way of example, a remote assistance service can be expected to generate a request for live sensor data indicative of the vehicle's environment and instructions to safely pass an object in an oncoming lane that is free of any objects. The signature verification plugin 350 can determine (at least in part) to forward (e.g., response 650) the message 320 in the event the message type 615 is expected from the originating sender 610 and/or discard (e.g., response 650) the message 320 in the event the message type 615 in not expected from the originating sender 610.

In some implementations, the signature verification plugin 350 can determine a message priority 605 associated with the message 320. The message priority 605, for example, can identify a priority level of the message 320 with respect to other messages received by the vehicle computing system. The priority level of the message 320 can include at least one of one or more predefined priority levels such as a first priority level (e.g., a safety critical priority level), a second priority level (e.g., an intermediate priority level), a third priority (e.g., a basic priority level), etc.

The message priority 605 can be included in the message 320 and/or determined by the signature verification plugin 350. For example, the message priority 605 can be determined and included in the message 320 by the originating sender 610. In addition, or alternatively, the signature verification plugin 350 can determine a message priority 605 for the message 320 based on the message type 615, the originating sender 610, the content of the message 320, and/or one or more other aspects of the message 320. By way of example, the signature verification plugin 350 can determine a third priority level for a request 330 to obtain a current mileage for the vehicle, a second priority level to a request 330 to unlock the vehicle doors, and/or a first priority level to a request 330 to initiate an emergency stop.

The signature verification plugin 350 can determine the routing action (e.g., response 650, 655) based on a comparison of the computing system state (e.g., as indicated by the current blueprint 400) and the message priority 605. For example, the signature verification plugin 350 can compare the message priority 605 with one or more current states of the vehicle and/or processes of the vehicle. For instance, each message priority 605 can be associated with one or more prohibited states and/or permitted states. By way of example, a first priority level can be permitted during any current state of the vehicle, vehicle computing system, and/or processes running on the vehicle computing system, whereas a third priority level can be prohibited during a driving state of the vehicle, a deployed state of the vehicle computing system, a busy state of a process running on the vehicle computing system, etc.

The signature verification plugin 350 can compare the message priority 605 to the current computing system state as indicated by the current blueprint 400 to determine whether one or more permitted and/or prohibited states are present at the time the message 320 is received. The signature verification plugin 350 can determine the routing action (e.g., response 650, 655) based on the comparison. By way of example, the signature verification plugin 350 can determine that one or more processes of the vehicle computing system are busy due to low bandwidth. In response, the signature verification plugin 350 can determine a forwarding action (e.g., response 650) in the event that the message 320 is associated with first priority level (e.g., a safety critical message) and/or a discarding action (e.g., response 650) in the event that the message 320 is associated with a third priority level (e.g., a non-safety critical message). In this manner, the signature verification plugin 350 can determine a routing action (e.g., response 650) for the message 320 that accommodates performance differences in the current environment of the vehicle.

In some implementations, the signature verification plugin 350 can generate metrics data based on the routing action (e.g., response 650, 655). The metrics data, for example, can include an indication of the originating sender 610, the intended recipient 335, the computing system state (e.g., current blueprint 400), the routing action (e.g., response 650, 655), etc. The signature verification plugin 350 can provide the metrics data to one or more internal and/or external processes associated with the vehicle computing system. The signature verification plugin 350 and/or the one or more internal/remote processes can store the metrics data on one or more internal memory devices of the vehicle computing system and/or remote memory device of the one or more remote computing devices.

The metrics data can be utilized by the signature verification plugin 350, one or more devices of the vehicle computing system, and/or one or more remote computing devices. For instance, the signature verification plugin 350 can determine a reliability score of one or more remote processes of the computing system based, at least in part, on the metrics data. The reliability for a respective remote process, for example, can indicate whether messages received from the respective process are trustworthy. By way of example, a respective process can be less trustworthy based on a history of corrupting messages. The signature verification plugin 350 can be configured to forward a message received from a remote process (e.g., an originating sender 610) with a reliability score over a reliability threshold and discard a message from a remote process (e.g., an originating sender 610) with a reliability score under the reliability threshold.

Figure 8:
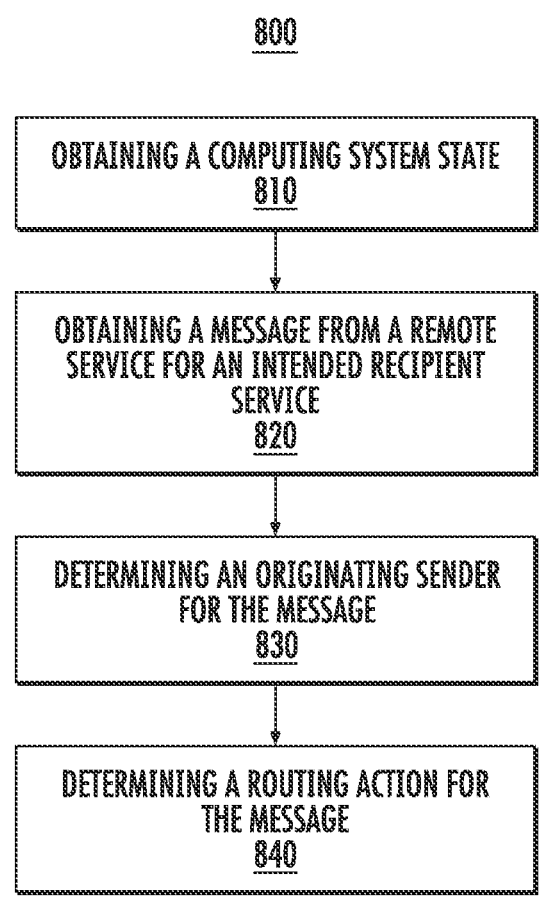
FIG. 8 depict a flowchart diagram of an example method for filtering messages according to example implementations of the present disclosure.

FIG. 8 depict a flowchart diagram of an example method 800 for filtering messages according to example implementations of the present disclosure. One or more portion(s) of the method 800 can be implemented by a computing system that includes one or more computing devices such as, for example, the computing systems described with reference to the other figures (e.g., the vehicle computing system 112, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-7, 12, 13, etc.), for example, to filtering messages based one or more factors. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 810, the method 800 can include obtaining a computing system state. For example, a computing system (e.g., vehicle computing system 112, etc.) can obtain a computing system state associated with a vehicle computing system.

At 820, the method 800 can include obtaining a message from a remote service for an intended recipient service. For example, a computing system (e.g., vehicle computing system 112, etc.) can obtain a message associated with an intended recipient process running on the vehicle computing system. The message can include a cryptographic signature.

At 830, the method 800 can include determining an originating sender for the message. For example, a computing system (e.g., vehicle computing system 112, etc.) can determine an originating sender of the message based at least in part on the cryptographic signature. The originating sender can be a remote process of one or more remote processes running on one or more remote computing devices that are remote from the vehicle computing system.

At 840, the method 800 can include determining a routing action for the message. For example, a computing system (e.g., vehicle computing system 112, etc.) can determine a routing action for the message based on a comparison of the originating sender and the computing system state. The routing action can be determined from a plurality of routing actions that include a discarding action indicative of discarding the message and a forwarding action indicative of transmitting the message to the intended recipient process. In some implementations, the computing system can perform the routing action for the message.

In some implementations, the computing system can determine a message type for the message. The message type can be indicative of an action associated with the message. The message type can include a respective message type of a plurality of predefined message types. Each of the plurality of predefined message types can be associated with at least one of the one or more remote processes. The computing system can determine the routing action based on a comparison of the message type and the originating sender.

In addition, or alternatively, the routing action for the message can be determined based, at least in part, on a comparison of the intended recipient process associated with the message and the computing system state. For instance, the computing system state can determine the discarding action in response to a determination that the intended recipient process is not at least one of a plurality of onboard processes running onboard an autonomous vehicle. The discarding action can include, for example, discarding the message before the message is transmitted to the intended recipient process.

Figure 9:
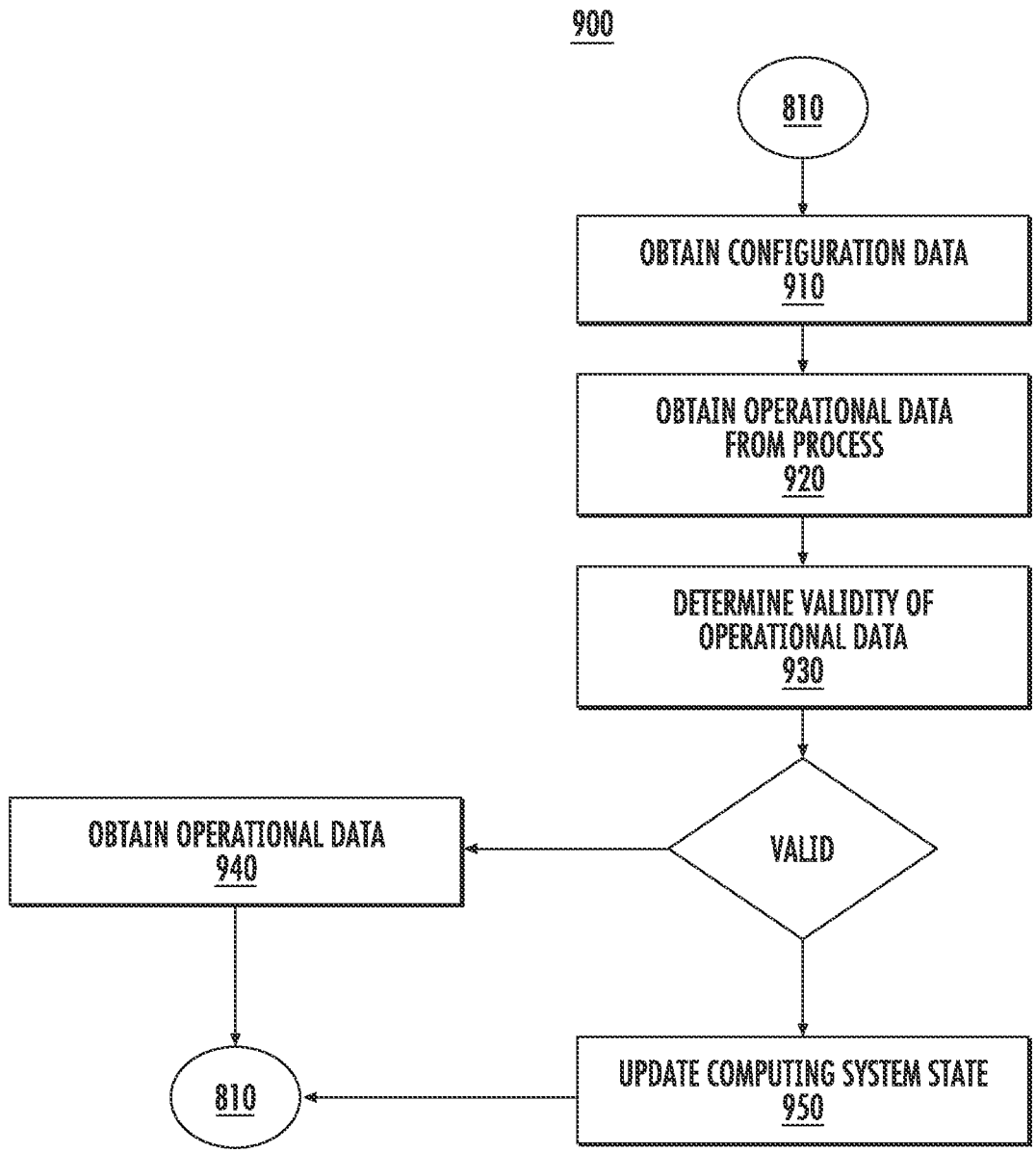
FIG. 9 depicts a flowchart diagram of an example method for obtaining a current computing system state according to example implementations of the present disclosure.

FIG. 9 depicts a flowchart diagram of an example method for obtaining a current computing system state according to example implementations of the present disclosure. One or more portion(s) of the method 900 can be implemented by a computing system that includes one or more computing devices such as, for example, the computing systems described with reference to the other figures (e.g., the vehicle computing system 112, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-7, 12, 13, etc.), for example, to filtering messages based one or more factors. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

Method 900 begins and ends at step 810 where the method 800 includes obtaining a computing system state. The computing system state, for example, can include dynamic data and static data. The dynamic data can include operational data indicative of at least one of an operational status of an autonomous vehicle and/or an operational status of one or more processes running on the autonomous vehicle. The static data can include configuration data indicative of at least one of a computing system type, computing system capabilities, or a hardware class associated with the vehicle computing system. The operational status of the autonomous vehicle can include one or more vehicle operational modes. The one or more vehicle operational modes can include at least one of an autonomous driving mode, a manual driving mode, a parking mode, and/or a calibration mode. The operational status of the one or more processes running on the autonomous vehicle can include one or more process operational modes. The one or more process operational modes can include at least one of an off mode, a running mode, a calibration mode, and/or an unknown mode.

At 910, the method 900 can include obtaining configuration data. For example, a computing system (e.g., vehicle computing system 112, etc.) can obtain static data associated with the autonomous vehicle. The static data can include vehicle configuration data indicative of at least one of a vehicle type, vehicle capabilities, or a vehicle class associated with the autonomous vehicle.

At 920, the method 900 can include obtaining operational data from a vehicle process. For example, a computing system (e.g., vehicle computing system 112, etc.) can obtain dynamic data associated with the autonomous vehicle. The dynamic data can include operational data indicative of at least one of an operational status of the autonomous vehicle or an operational status of one or more processes running on the autonomous vehicle. The computing system can store the dynamic data and/or the static data in one or more memories onboard the autonomous vehicle. In some implementations, the operational data can include one or more state changes associated with the autonomous vehicle or one or more processes running on the autonomous vehicle.

At 930, the method 900 can include determining validity of operational data. For example, a computing system (e.g., vehicle computing system 112, etc.) can determine the validity of the operational data based on the vehicle process that generated a message indicative of the operational data.

At 940, the method 900 can include discarding operational data. For example, a computing system (e.g., vehicle computing system 112, etc.) can discard the operational data in the event that a vehicle process that generated the message indicative of the operational data is not reliable.

At 950, the method 900 can include updating a computing system state. For example, a computing system (e.g., vehicle computing system 112, etc.) can maintain a current blueprint of the autonomous vehicle representative of the current computing system state by updating the operational status associated with the autonomous vehicle or the one or more processes running on the autonomous vehicle based, at least in part, on the operational data.

Figure 10:
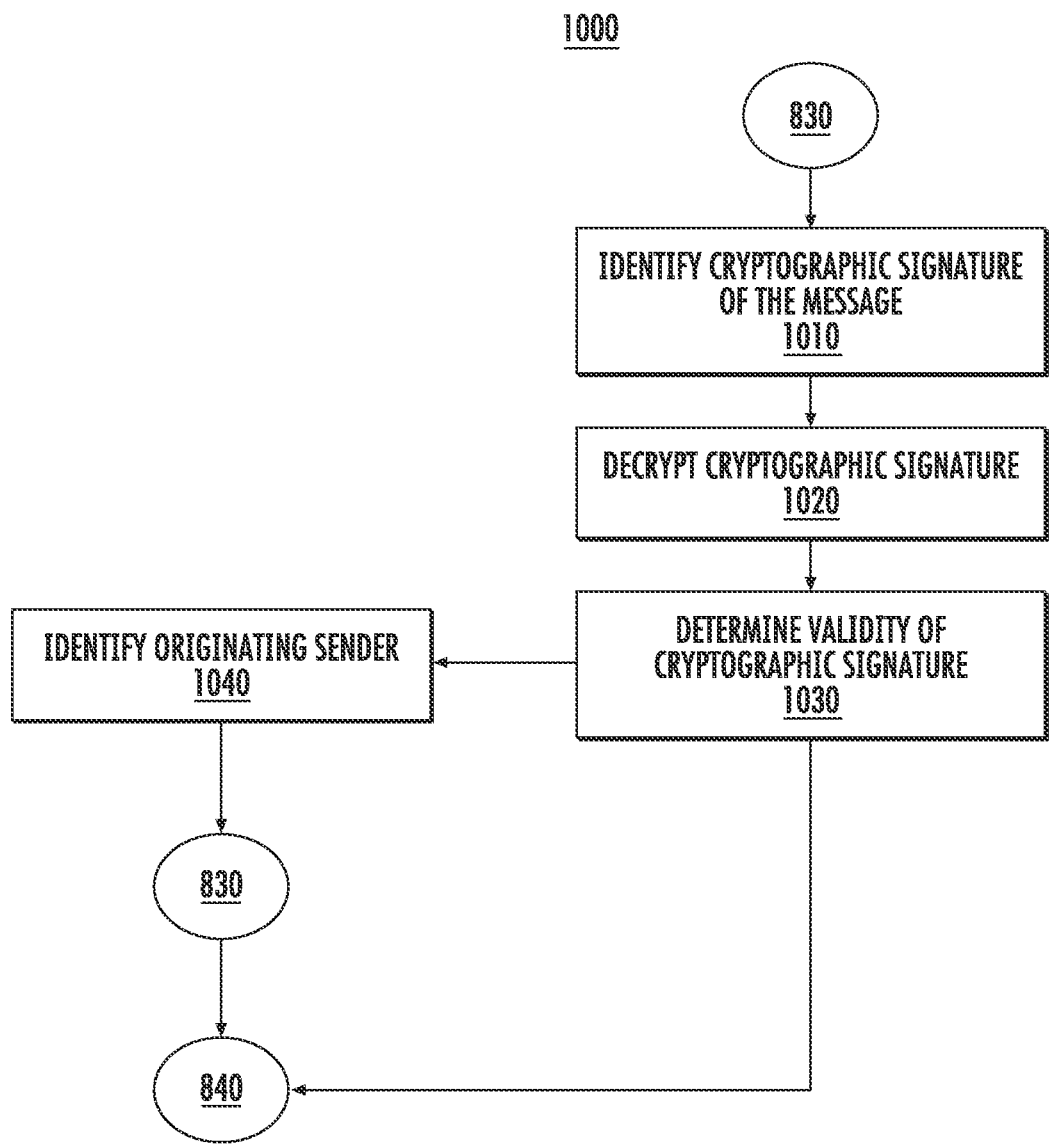
FIG. 10 depicts a flowchart diagram of an example method for an originating sender of a message according to example implementations of the present disclosure.

FIG. 10 depicts a flowchart diagram of an example method 1000 for determining an originating sender of a message according to example implementations of the present disclosure. One or more portion(s) of the method 1000 can be implemented by a computing system that includes one or more computing devices such as, for example, the computing systems described with reference to the other figures (e.g., the vehicle computing system 112, etc.). Each respective portion of the method 1000 can be performed by any (or any combination) of one or more computing devices. Moreover, one or more portion(s) of the method 1000 can be implemented as an algorithm on the hardware components of the device(s) described herein (e.g., as in FIGS. 1-7, 12, 13, etc.), for example, to filtering messages based one or more factors. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

Method 1000 begins at step 830 where the method 800 includes determining an originating sender for the message.

At 1010, the method 1000 can include identifying a cryptographic signature of a message. For example, a computing system (e.g., vehicle computing system 112, etc.) can identifying the cryptographic signature of the message.

At 1020, the method 1000 can include decrypting the cryptographic signature. For example, a computing system (e.g., vehicle computing system 112, etc.) can decrypt the cryptographic signature of the message.

At 1030, the method 1000 can include determining the validity of the cryptographic signature. For example, a computing system (e.g., vehicle computing system 112, etc.) can determine the validity of the cryptographic signature.

The method 1000 can return to step 840 where the method 800 includes determining a routing action for the message based on the validity of the cryptographic signature.

At 1040, the method 1000 can include identifying the originating sender. For example, a computing system (e.g., vehicle computing system 112, etc.) can identify the originating sender of the message based, at least in part, on the decrypted signature. For example, the cryptographic signature can be process specific. The cryptographic signature can be previously generated for the message by the originating sender. The method 1000 can return to step 830 where the method 800 includes determining the originating sender for the message.

Figure 11:
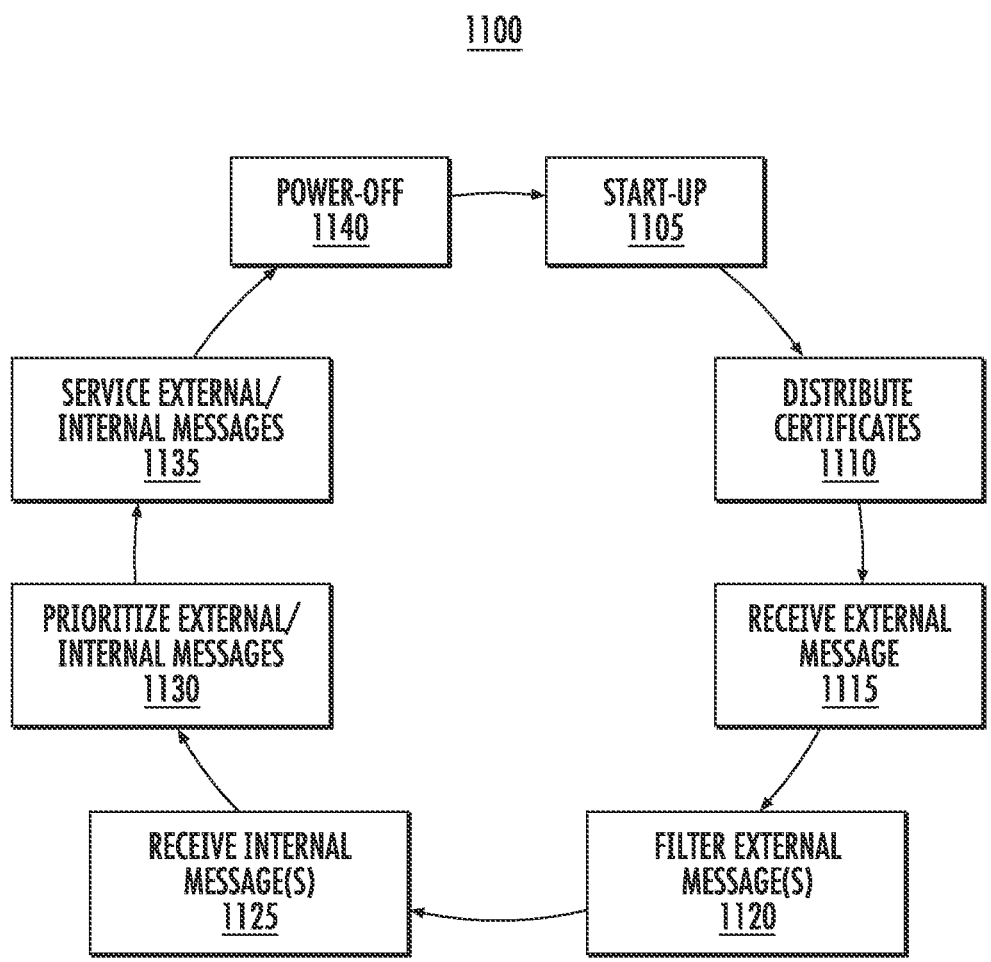
FIG. 11 depicts an example overview of message signing and processing according to example implementations of the present disclosure.

FIG. 11 depicts an example overview of message signing and processing according to example implementations of the present disclosure. For example, at start-up 1105, the computing system 1100 can begin distributing certificates 1110 (intermediate certificates, operational certificates, etc.) to one or more devices (remote devices, vehicle devices, etc.) and/or processes interacting with the computing system 1100. Each certificate can identify a respective device and/or process. In this manner, the computing system 1100 can identify messages transmitted between processes and/or devices with application level certainty. By way of example, each message can include an operational certificate that identifies the process (e.g., software container, application, etc.) that generated the message.

The computing system 1100 and/or a portion thereof (e.g., vehicle computing system 112 of FIG. 1) can receive external messages 1115 from one or more remote devices (e.g., device remote from the vehicle computing system 112). The computing system (e.g., vehicle computing system 112) can filter the external message(s) 1120 (e.g., at a communication interface 136 of the vehicle computing system 112) based on the remote process that generated the message (e.g., originating sender 610) and/or an internal process (e.g., running on the vehicle computing system 112) for which the message is intended (intended recipient process 335).

In addition, the computing system 1100 and/or a portion thereof (e.g., vehicle computing system 112 of FIG. 1) can receive internal messages 1125 from one or more internal processes (e.g., running on the vehicle computing system 112). The computing system 1100 can prioritize the external and/or internal messages 1130 based on the respective processes that generated the messages. The computing system 1100 can service the external and/or internal messages 1135 based on the assigned message priority by forwarding the messages, assigning computing resources to the message, initiating a vehicle action in response the message, etc. In this manner, the computing system 1100 can facilitate the transfer of messages between processes interacting with the computing system 1100 based on application level knowledge of the messaging processes until the computing system and/or portion thereof is powered-off 1140.

Figure 12:
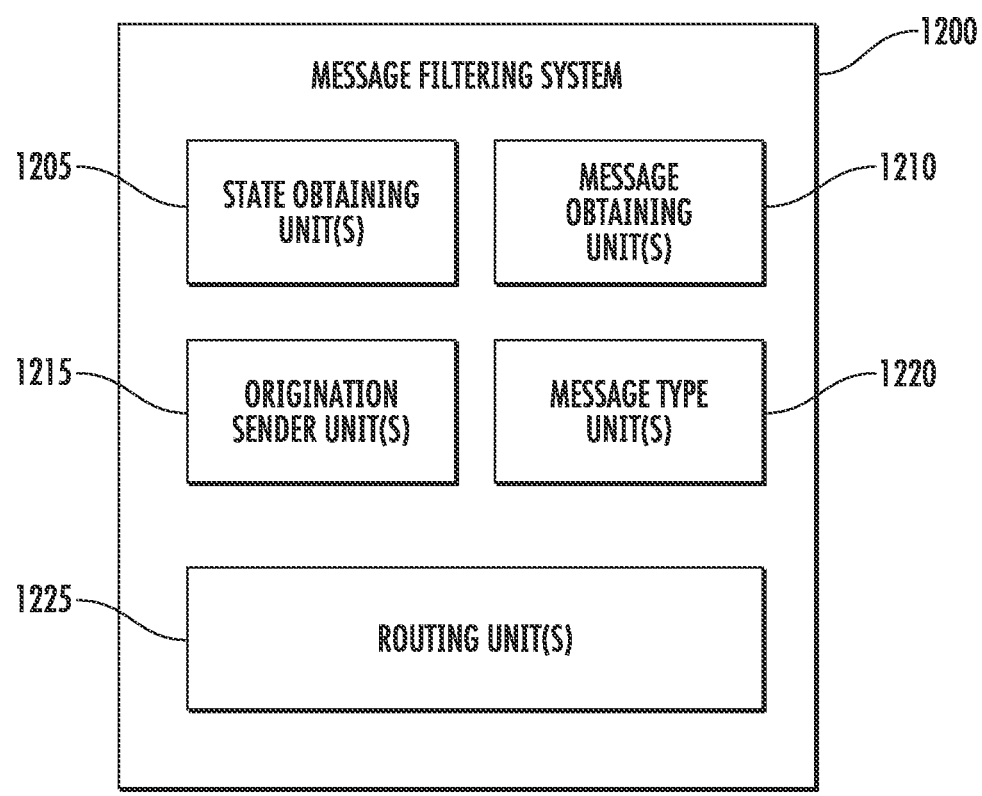
FIG. 12 depicts example system with various means for performing operations and functions according example implementations of the present disclosure.

FIG. 12 depicts example message filtering system 1200 with various means for performing operations and functions according example implementations of the present disclosure. One or more operations and/or functions in FIG. 12 can be implemented and/or performed by one or more devices (e.g., one or more computing devices of the vehicle computing system 112) or systems including, for example, the operations computing system 104, the vehicle 108, or the vehicle computing system 112, which are shown in FIG. 1.

Further, the one or more devices and/or systems in FIG. 12 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a computing system can include state obtaining unit(s) 2105, message obtaining unit(s) 1210, originating sender unit(s) 1215, message type unit(s) 1220, routing unit(s) 1225, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., state obtaining unit(s) 1205, etc.) can be configured to obtain a computing system state associated with a vehicle computing system.

The means (e.g., message obtaining unit(s) 1210, etc.) can be configured to obtain a message from at least one remote process of one or more remote processes running on one or more computing devices remote from the vehicle computing system. The message can be associated with an intended recipient process running on the vehicle computing system.

The means (e.g., originating sender unit(s) 1215, etc.) can be configured to determine an originating sender for the message. The originating sender can be indicative of a remote process of the one or more remote processes that generated the message. The means (e.g., message type unit(s) 1220, etc.) can be configured to determine a message type for the message. The message type can be indicative of an action associated with the message.

The means (e.g., routing unit(s) 1225, etc.) can be configured to determine a routing action for the message based on a comparison of the originating sender and the computing system state. In addition, the means (e.g., routing unit(s) 1225, etc.) can be configured to determine a routing action based on a comparison of the message type and the computing system state. The routing action can include a discarding action indicative of discarding the message or a forwarding action indicative of transmitting the message to the intended recipient process.

FIG. 13 depicts example system components of an example system 1300 according to example embodiments of the present disclosure. The example system 1300 can include the computing system 1305 (e.g., a vehicle computing system 112) and the computing system(s) 1350 (e.g., operations computing system 104, remote computing device(s) 106, etc.), etc. that are communicatively coupled over one or more network(s) 1345.

The computing system 1305 can include one or more computing device(s) 1310 (e.g., vehicle devices running an intended recipient process 335, etc.). The computing device(s) 1310 of the computing system 1305 can include processor(s) 1315 and a memory 1320. The one or more processors 1315 can be any suitable processing device (e.g., a processor core, a microprocessor, an ASIC, a FPGA, a controller, a microcontroller, etc.) and can be one processor or a plurality of processors that are operatively connected. The memory 1320 can include one or more non-transitory computer-readable storage media, such as RAM, ROM, EEPROM, EPROM, one or more memory devices, flash memory devices, etc., and combinations thereof.

The memory 1320 can store information that can be accessed by the one or more processors 1315. For instance, the memory 1320 (e.g., one or more non-transitory computer-readable storage mediums, memory devices) can include computer-readable instructions 1325 that can be executed by the one or more processors 1315. The instructions 1325 can be software written in any suitable programming language or can be implemented in hardware. Additionally, or alternatively, the instructions 1325 can be executed in logically and/or virtually separate threads on processor(s) 1315.

For example, the memory 1320 can store instructions 1325 that when executed by the one or more processors 1315 cause the one or more processors 1315 to perform operations such as any of the operations and functions of the vehicle computing system 112, or for which the vehicle computing system 112 is configured, as described herein.

The memory 1320 can store data 1330 that can be obtained, received, accessed, written, manipulated, created, and/or stored. The data 1330 can include, for instance, configuration data, static data, dynamic data, blueprint data, current state data, and/or other data/information described herein. In some implementations, the computing device(s) 1310 can obtain from and/or store data in one or more memory device(s) that are remote from the computing system 1305 such as one or more memory devices of the computing system 1350.

The computing device(s) 1310 can also include a communication interface 1335 used to communicate with one or more other system(s) (e.g., computing system 1350). The communication interface 1335 can include any circuits, components, software, etc. for communicating via one or more networks (e.g., 1345). In some implementations, the communication interface 1335 can include for example, one or more of a communications controller, receiver, transceiver, transmitter, port, conductors, software and/or hardware for communicating data/information.

The computing system 1350 can include one or more computing devices 1355 (e.g., remote device(s) running remote process 310, originating sender process 610, etc.). The one or more computing devices 1355 can include one or more processors 1360 and a memory 1365. The one or more processors 1360 can be any suitable processing device (e.g., a processor core, a microprocessor, an ASIC, a FPGA, a controller, a microcontroller, etc.) and can be one processor or a plurality of processors that are operatively connected. The memory 1365 can include one or more non-transitory computer-readable storage media, such as RAM, ROM, EEPROM, EPROM, one or more memory devices, flash memory devices, etc., and combinations thereof.

The memory 1365 can store information that can be accessed by the one or more processors 1360. For instance, the memory 1365 (e.g., one or more non-transitory computer-readable storage mediums, memory devices) can store data 1375 that can be obtained, received, accessed, written, manipulated, created, and/or stored. The data 1375 can include, for instance, process data, certificate data, cryptographic signing data, and/or other data or information described herein. In some implementations, the computing system 1350 can obtain data from one or more memory device(s) that are remote from the computing system 1350.

The memory 1365 can also store computer-readable instructions 1370 that can be executed by the one or more processors 1360. The instructions 1370 can be software written in any suitable programming language or can be implemented in hardware. Additionally, or alternatively, the instructions 1370 can be executed in logically and/or virtually separate threads on processor(s) 1360. For example, the memory 1365 can store instructions 1370 that when executed by the one or more processors 1360 cause the one or more processors 1360 to perform any of the operations and functions described herein, including, for example, any of the operations and functions of the operations computing system 102, remote computing devices 106, and/or other operations and functions.

The computing device(s) 1355 can also include a communication interface 1380 used to communicate with one or more other system(s). The communication interface 1380 can include any circuits, components, software, etc. for communicating via one or more networks (e.g., 1345). In some implementations, the communication interface 1380 can include for example, one or more of a communications controller, receiver, transceiver, transmitter, port, conductors, software and/or hardware for communicating data/information.

The network(s) 1345 can be any type of network or combination of networks that allows for communication between devices. In some embodiments, the network(s) 1345 can include one or more of a local area network, wide area network, the Internet, secure network, cellular network, mesh network, peer-to-peer communication link and/or some combination thereof and can include any number of wired or wireless links. Communication over the network(s) 1345 can be accomplished, for instance, via a network interface using any type of protocol, protection scheme, encoding, format, packaging, etc.

FIG. 13 illustrates one example system 1300 that can be used to implement the present disclosure. Other computing systems can be used as well. Computing tasks discussed herein as being performed at vehicle computing device(s) can instead be performed remote from the vehicle (e.g., via the operations computing system, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for routing a message received by an autonomous vehicle, the method comprising:
   obtaining, from an originating sender, a message associated with a recipient process running on a vehicle computing system of the autonomous vehicle;
   obtaining operational data associated with the autonomous vehicle, the operational data obtained at a particular time associated with obtaining the message;
   processing the recipient process and the originating sender based on the operational data to determine whether a prohibited state or a permitted state for receiving messages is present at the particular time;
   determining, based on the processing, a routing action comprising one of a discarding action for discarding the message or a forwarding action for transmitting the message, wherein the discarding action is implemented upon the prohibited state associated with the recipient process or the originating sender being present at the particular time, and wherein the forwarding action is implemented upon the permitted state associated with the recipient process or the originating sender being present at the particular time; and
   performing the routing action for the message.

2. The computer-implemented method of claim 1, wherein the operational data is indicative of an operational status of the autonomous vehicle.

3. The computer-implemented method of claim 2, wherein the operational status of the autonomous vehicle comprises one or more vehicle operational modes, the one or more vehicle operational modes comprising at least one of an autonomous driving mode, a manual driving mode, a parking mode, or a calibration mode.

4. The computer-implemented method of claim 1, wherein the operational data is indicative of an operational status of one or more processes running on the vehicle computing system of the autonomous vehicle.

5. The computer-implemented method of claim 4, wherein the operational status of the one or more processes running on the autonomous vehicle comprise one or more process operational modes, the one or more process operational modes comprising at least one of an off mode, a running mode, or a calibration mode.

6. The computer-implemented method of claim 5, wherein:
   the off mode is indicative of the one or more processes being turned off at the particular time;
   the running mode is indicative of the one or more processes being turned on at the particular time; and
   the calibration mode is indicative of the one or more processes starting up or undergoing maintenance at the particular time.

7. The computer-implemented method of claim 1, wherein the recipient process comprises a provisioning process configured to update one or more software components of the vehicle computing system.

8. The computer-implemented method of claim 1, wherein the prohibited state associated with the recipient process comprises one of a driving state of the autonomous vehicle, a deployed state of the vehicle computing system, or a busy state of a process running on the vehicle computing system.

9. The computer-implemented method of claim 8, wherein:

the driving state of the autonomous vehicle is indicative of the autonomous vehicle driving on a road at the particular time;
the deployed state of the vehicle computing system is indicative of the vehicle computing system being engaged while the autonomous vehicle is completing a service request at the particular time;
the busy state of the process running on the vehicle computing system comprises application level knowledge of the process completing tasks on the vehicle computing system at the particular time.

10. The computer-implemented method of claim 1, wherein the permitted state associated with the recipient process comprises a parked state of the autonomous vehicle, an off state of the vehicle computing system, or an idle state of a process running on the vehicle computing system.

11. The computer-implemented method of claim 10, wherein:
   the parked state of the autonomous vehicle is indicative of the autonomous vehicle being parked at the particular time;
   the off state of the vehicle computing system is indicative of the vehicle computing system being turned off at the particular time;
   the idle state of the process running on the vehicle computing system comprises application level knowledge of the process not completing tasks on the vehicle computing system at the particular time.

12. The computer-implemented method of claim 1, wherein:
   the message associated with the recipient process comprises an annotation including a cryptographic signature previously generated for the message by the originating sender using a process specific identifier that is unique to a specific process; and
   the method further comprises determining the originating sender for the message based on the annotation.

13. The computer-implemented method of claim 1, wherein the message is associated with a message priority, and wherein the method further comprises:
   processing the message priority based on the operational data; and
   determining, based on the processing of the message priority, a routing action comprising one of a discarding action for discarding the message or a forwarding action for transmitting the message, wherein the discarding action is indicative of the message priority having a first priority level, and wherein the forwarding action is indicative of the message priority having a second priority level that is different than the first priority level.

14. The computer-implemented method of claim 1, further comprising:
   generating metrics data based on the routing action, the metrics data comprising an indication of the originating sender, the recipient process, and the routing action;
   providing the metrics data to one or more processes associated with the vehicle computing system; and
   determining, by the one or more processes associated with the vehicle computing system and based on the metrics data, a reliability score indicative of a level of trustworthiness of the originating sender.

15. A vehicle computing system for an autonomous vehicle, the vehicle computing system comprising:
   one or more processors; and
   one or more tangible, non-transitory, computer readable media that store instructions that are executable by the one or more processors to cause the vehicle computing system to perform operations, the operations comprising:

obtaining, from an originating sender, a message associated with a recipient process running on a vehicle computing system of the autonomous vehicle;

obtaining operational data associated with the autonomous vehicle, the operational data obtained at a particular time associated with obtaining the message;

processing the recipient process and the originating sender based on the operational data to determine whether a prohibited state or a permitted state for receiving messages is present at the particular time;

determining, based on the processing, a routing action comprising one of a discarding action for discarding the message or a forwarding action for transmitting the message, wherein the discarding action is implemented upon the prohibited state associated with the recipient process or the originating sender being present at the particular time, and wherein the forwarding action is implemented upon the permitted state associated with the recipient process or the originating sender being present at the particular time; and performing the routing action for the message.

16. The vehicle computing system of claim 15, wherein the message is associated with a message priority, and wherein the operations further comprise:

processing the message priority based on the operational data; and determining, based on the processing of the message priority, a routing action comprising one of a discarding action for discarding the message or a forwarding action for transmitting the message, wherein the discarding action is indicative of the message priority having a first priority level, and wherein the forwarding action is indicative of the message priority having a second priority level that is different than the first priority level.

17. The vehicle computing system of claim 15, the operations further comprising:

generating metrics data based on the routing action, the metrics data comprising an indication of the originating sender, the recipient process, and the routing action;

providing the metrics data to one or more processes associated with the vehicle computing system; and determining, by the one or more processes associated with the vehicle computing system and based on the metrics data, a reliability score indicative of a level of trustworthiness of the originating sender.

18. The vehicle computing system of claim 15, wherein:

the message associated with the recipient process comprises an annotation including a cryptographic signature previously generated for the message by the originating sender using a process specific identifier that is unique to a specific process; and the operations further comprise determining the originating sender for the message based on the annotation.

19. The vehicle computing system of claim 15, wherein:

the prohibited state associated with the recipient process comprises one of a driving state of the autonomous vehicle, a deployed state of the vehicle computing system, or a busy state of a process running on the vehicle computing system; and the permitted state associated with the recipient process comprises a parked state of the autonomous vehicle, an off state of the vehicle computing system, or an idle state of a process running on the vehicle computing system.

20. An autonomous vehicle comprising:

one or more communication interfaces;

one or more processors; and one or more tangible, non-transitory, computer readable media that store instructions that are executable by the one or more processors to cause the one or more processors to perform operations associated with a signature verification plugin, the operations comprising:

obtaining, by the one or more communication interfaces, from an originating sender, a message associated with a recipient process running on a vehicle computing system of the autonomous vehicle;

obtaining operational data associated with the autonomous vehicle, the operational data obtained at a particular time associated with obtaining the message;

processing the recipient process and the originating sender based on the operational data to determine whether a prohibited state or a permitted state for receiving messages is present at the particular time;

determining, based on the processing, a routing action comprising one of a discarding action for discarding the message or a forwarding action for transmitting the message, wherein the discarding action is implemented upon the prohibited state associated with the recipient process or the originating sender being present at the particular time, and wherein the forwarding action is implemented upon the permitted state associated with the recipient process or the originating sender being present at the particular time; and performing the routing action for the message.

* * * * *